(12) United States Patent
Ando et al.

(10) Patent No.: US 6,542,694 B2
(45) Date of Patent: Apr. 1, 2003

(54) OPTICAL DISC FOR STORING MOVING PICTURES WITH TEXT INFORMATION AND APPARATUS USING THE DISC

(75) Inventors: Hideo Ando, Hino; Shinichi Kikuchi, Yokohama; Yuji Ito, Tokyo; Kazuhiko Taira, Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/773,692

(22) Filed: Feb. 2, 2001

(65) Prior Publication Data

US 2001/0014208 A1 Aug. 16, 2001

Related U.S. Application Data

(62) Division of application No. 09/630,541, filed on Aug. 1, 2000, which is a division of application No. 09/461,618, filed on Dec. 15, 1999, now Pat. No. 6,259,858.

(30) Foreign Application Priority Data

Dec. 16, 1998 (JP) .......................... 10-358042

(51) Int. Cl.$^7$ ................................ H04N 5/91
(52) U.S. Cl. .................. 386/95; 386/125; 386/126
(58) Field of Search ...................... ; 386/125, 126, 386/95, 52, 55, 124, 46, 83; H04N 5/91, 5/781

(56) References Cited

U.S. PATENT DOCUMENTS

| | | | | |
|---|---|---|---|---|
| 5,294,982 A | * | 3/1994 | Salomon et al. | 348/461 |
| 6,038,366 A | * | 3/2000 | Ohno et al. | 386/46 |
| 6,078,727 A | * | 6/2000 | Saeki et al. | 386/125 |
| 6,148,138 A | * | 11/2000 | Sawabe et al. | 386/83 |
| 6,181,870 B1 | * | 1/2001 | Okada et al. | 386/95 |
| 6,259,858 B1 | * | 7/2001 | Ando et al. | 386/95 |

FOREIGN PATENT DOCUMENTS

| | | |
|---|---|---|
| JP | 59-191176 | 10/1984 |
| JP | 9-265765 | 10/1997 |

* cited by examiner

*Primary Examiner*—Vincent Boccio
(74) *Attorney, Agent, or Firm*—Oblon, Spivak, McClelland, Maier & Neustadt, P.C.

(57) ABSTRACT

When moving pictures are recorded onto an optical disc, not only is text data recorded, but also video-recording start date and time, video-recording end date and time, and source name or channel number serving as primary text data are recorded in alphanumeric characters program by program or cell by cell, a program or a cell being used as a unit of video-recording. Other text data is recorded together with language code. Since the primary text data used to select video data is expressed in alphanumeric characters, a program or cell to be reproduced can be selected, regardless of language, and the text information in the same language as that of the apparatus can be searched for.

25 Claims, 17 Drawing Sheets

| | DVD_RTR DIRECTORY (DVD_RTAV) |
|---|---|
| VMG (RTR_VMG) | RTR VIDEO MANAGER INFORMATION (VMGI OR RTR_VMGI) |
| | MOVIE AV FILE INFORMATION TABLE (M_AVFIT) |
| | STILL PICTURE AV FILE INFORMATION TABLE (S_AVFIT) |
| | ORIGINAL PGC INFORMATION (ORG_PGCI) |
| | USER DEFINED PGC INFORMATION TABLE (UD_PGCIT) |
| | TEXT DATA MANAGER (TXTDT_MG) |
| | MANUFACTURE'S INFORMATION TABLE (MNFIT) |
| | VIDEO DATA OF VMG MENU (VMGM_VOBS) |
| | BACKUP OF RTR_VMGI |
| ONE VTS | MANAGEMENT DATA OF VTS (VTSI=RTR_VMGI) |
| | VIDEO DATA OF VTS MENU (VTSM_VOBS=VMGM_VOBS) |
| | VIDEO DATA OF VTS (VTSTT_VOBS OR PROGRAM(S)) |
| | BACKUP OF VTSI (=BACKUP OF RTR_VMGI) |

FIG. 2

TXTDT_LU_SRP

|  | CONTENTS | NUMBER OF BYTES |
|---|---|---|
| TXTDT_LCD | LANGUAGE CODE OF PRIMARY TEXT DATA | 2 BYTES |
| reserved | RESERVED | 1 BYTE |
| CHRS | CHARACTER SET | 1 BYTE |
| TXTDT_LU_SA | START ADDRESS OF TXTDT_LU | 4 BYTES |
| OPTION_TXTDT_LCD | LANGUAGE CODE OF OTHER TEXT DATA | 2 BYTES |

FIG. 5

C_PBI (OR CELL INFORMATION CI)

| RBP | | CONTENTS | NUMBER OF BYTES |
|---|---|---|---|
| 0 TO 3 | C_CAT | | |
| 4 TO 7 | C_PBTM | | |
| 8 TO 11 | C_FVOBU_SA | | |
| 12 TO 15 | C_FVOBU_EA | | |
| 16 TO 19 | C_LVOBU_SA | | |
| 20 TO 23 | C_LVOBU_EA | | |
| 24 TO 51 | PRIMARY TEXT INFORMATION | RECORDING START TIME STAMP (YEAR;4B, MONTH;4B, HOUR/MIN;3B) | 11 BYTES |
| | | RECORDING END TIME STAMP (YEAR;4B, MONTH;4B, HOUR/MIN;3B) | 11 BYTES |
| | | SOURCE NAME & TV CHANNEL NUMBER | 6 BYTES |
| 52 TO 53 | ITEM Number OF TEXT | TEXT ITEM NUMBER | 2 BYTES |
| | | TOTAL | 54 BYTES |

FIG. 7

PROGRAM INFORMATION PGI

| RBP | | CONTENTS | NUMBER OF BYTES |
|---|---|---|---|
| 0 TO 0 | EN_CN | ENTRY CELL NUMBER | 1 BYTE |
| 1 TO 29 | PRIMARY TEXT INFORMATION | RECORDING START TIME STAMP (YEAR;4B, MONTH;4B, HOUR/MIN;3B) | 11 BYTES |
| | | RECORDING START TIME STAMP (YEAR;4B, MONTH;4B, HOUR/MIN;3B) | 11 BYTES |
| | | SOURCE NAME & TV CHANNEL NUMBER | 6 BYTES |
| 30 TO 31 | ITEM Number OF TEXT | TEXT ITEM NUMBER | 2 BYTES |
| | | TOTAL | 32 BYTES |

FIG. 8

*1> PGC INFORMATION (OR UD_PGCI) CAN DEFINE A GROUP OF ONE OR MORE PROGRAMS;
*2> EACH PROGRAM CAN BE FORMED OF ONE OR MORE CELLS;
*3> EACH CELL CAN BE SPECIFIED BY CELL ID (OR CI_SRP);
*4> EACH CELL ID (OR CI_SRP) CAN INDICATE POSITION (OR START ADDRESS) OF CELL INFORMATION (OR CI);
*5> EACH CELL INFORMATION (OR CI) CAN DETERMINE START TIME AND END TIME OF PRESENTATION OF CELL

OPTICAL DISC FOR STORING MOVING PICTURES WITH TEXT INFORMATION AND APPARATUS USING THE DISC

This application is a Divisional of application Ser. No. 09/630,541, filed on Aug. 1, 2000, which is a Divisional of application Ser. No. 09/461,618, filed on Dec. 15, 1999. U.S. Pat. No. 6,259,858B1.

BACKGROUND OF THE INVENTION

This invention relates to an optical disc on which video data, audio data, and the like are recorded, an optical disc recording apparatus for recording data onto the optical disc, and an optical disc reproducing apparatus for reproducing the data recorded on the optical disc.

In recent years, moving-picture-compatible optical disc playback systems have been developed which play back an optical disc on which video data, audio data, and the like have been recorded. They have been widely used in the form of, for example, LDs (Laser Discs) or video CDs for the purpose of reproducing movie software or karaoke.

In this connection, the DVD (Digital Versatile Disc) standard employing the internationally standardized MPEG-2 (Motion Picture Experts Group 2) scheme and the AC (Audio Compression)-3 scheme has been proposed.

The DVD standard supports MPEG-2 for moving picture compression scheme and AC-3 audio and MPEG audio for audio recording scheme according to the MPEG-2 system layer architecture. The DVD standard further supports sub-picture data, obtained by run-length compressing the bit map data for subtitles, and special playback control data (navigation pack) such as fast-forward playback or fast-rewind playback data.

Furthermore, the DVD standard supports ISO 9660 and micro UDF (or UDF Bridge) to allow computers to read data of DVD.

Presently, however, the DVD standard takes no account of home recording/reproducing systems. When home recording/reproducing systems are constructed according to the standard, the following problem arise.

In DVD, information on title is defined as text information.

The text information, which is used for retrieval or search, has not been used much, because the DVD-ROM video has a menu (menu pictures) the title producer created, such as VMGM (video manager menu) or VTSM (video title set menu). In home recording/reproducing systems, however, a menu cannot be entered beforehand to record TV programs or moving pictures and still pictures (photographic data) from a camera into a DVD-RAM. Thus, retrieval or search using the text information becomes important.

In the DVD-ROM video, however, the text information has been created, taking no account of language. More specifically, in European countries and Asian countries, language differs from one TV station to another or from one program to another. Additionally, assume a case where a person goes abroad, carrying a DVD recorder with him or her, and does video-recording where he or she is staying. Under this assumption, if it is unknown which language the text information was recorded, the DVD recorder (or player) cannot judge whether or not a character generator (e.g., kanji ROM) corresponding to its language code is provided therein, when the text information is decoded. This makes the decoding difficult. Moreover, when the text information does not correspond to the language, information retrieval (search) and the like cannot be performed at all.

BRIEF SUMMARY OF THE INVENTION

The present invention aims to remove the drawback that, when the language in the text information corresponding to the video data to be recorded varies each time recording is done on a video-data-recording optical disc (or information storage medium), this cannot be dealt with and text retrieval cannot be performed.

A first object of the present invention is to provide an optical disc (or information storage medium) which enables multilingual text retrieval.

A second object of the present invention is to provide an apparatus for recording information on the optical disc (or information storage medium).

A third object of the present invention is to provide an apparatus for reproducing the recorded information from the optical disc (or information storage medium).

To accomplish the first object, an optical disc (or an information storage medium) according to the present invention has a management area (RTR. IFO of FIG. 13D/RTR_VMG of FIG. 13E) and a data area (1012 to 1016 in FIG. 13D). In the data area (1012 to 1016), data (including video data and audio data) is separated into one or more sequences (PGCs), which are then recorded. Each sequence (PGC) is composed of one or more programs corresponding to one or more cells (see FIG. 15).

Here, one cell corresponds to one or more data unit (VOBU in FIG. 3). One data unit (VOBU) includes one or more packs of pictures or sound to be reproduced in a period of time in a specific range (0.5 to 1.2 seconds).

In the management area (RTR_VMG), a sequence management table (PGCIT of FIG. 6, 1752 in FIG. 16, ORG_PGCI or UD_PGCIT of FIG. 17)) for managing program sequences by determining the playback sequence (or an order of playback) of the cells and a program management table (PGC_PGI of FIG. 6, PGI # in FIG. 15 or 17) exist independently or partially overlap with each other.

In the program management table (PGI #1), first text information (PRM_TXTI) expressed in alphanumeric characters (e.g., the ASCII code) is recorded.

In a specific area (TXTDT_MG in FIG. 4 or FIG. 16) different from the program management table (PGI #) in the management area, second text information (IT_TXT) is recorded in the same as or a different language from that of the first text information (PRM_TXTI).

In the optical disc, the first text information (PRM_TXTI) includes first retrieval information (ST23 in FIG. 10) usable in searching for the programs.

Additionally, in the optical disc, the second text information (IT_TXT) includes second retrieval information (ST25 in FIG. 10) usable in searching for the programs.

Furthermore, in the optical disc, the second text information (IT_TXT in FIG. 12) includes an identification code (IDCD), the size of text information (TXT_SZ), and the body of text information (TXT).

Alternatively, in the optical disc, the second text information (IT_TXT in FIG. 12) includes an identification code (IDCD) and the size of text information (TXT_SZ).

Furthermore, in the optical disc, the sequence management table (VOB sequence information 1752 in FIG. 16) includes a search pointer (PL_SRP #) which points at a specific point in the program sequence (VOB sequence) and includes the first text information (PRM_TXTI).

Moreover, in the optical disc, the specific area (TXTDT_MG in FIG. 16) is included in the management area (RTR_

VMG) and includes the second text information (IT_TXT) as sub-information for the first text information (PRM_TXTI).

Additionally, in the optical disc, the first text information (PRM_TXTI) and second text information (IT_TXT) can be used in searching for the programs and a search using the first text information (PRM_TXTI) has priority of search over a search using the second text information (IT_TXT) (in FIG. 10, ST25 using IT_TXT is after the process at ST18 using PRM_TXTI).

In addition, in the optical disc, the management area (RTR_VMG) includes a management table (CI in FIG. 17) for managing the cells, and text information (PRM_TXTI) expressed in alphanumeric characters is recorded in the cell management table (M_CI or S_CI in FIG. 17).

Here, the first text information (PRM_TXTI) can include at least one of video-recording start date and time, video-recording end date and time, a source name, and a channel number.

To achieve the second object, a recording apparatus according to the present invention uses an optical disc (10) having a management area (RTR_VMG in FIG. 13E) and a data area (1012 to 1016 in FIG. 13D) in which one or more programs have been recorded, the management area (RTR_VMG) including a sequence management table (ORG_PGCI or UD_PGCIT) for managing the sequence of the programs and a program management table (PGI) for managing the programs.

The recording apparatus comprises: first recording means (101 to 104 in FIG. 1, ST4 in FIG. 9) for recording data in programs into the data area on the optical disc; second recording means (101 to 104 in FIG. 1, ST2 in FIG. 9) for recording first text information (PRM_TXTI) expressed in alphanumeric characters and usable in searching for the programs into the program management table (PGI) on the optical disc; and third recording means (101 to 104 in FIG. 1, ST3 in FIG. 9) for recording second text information (IT_TXT) usable in searching for the programs into an area different from the program management table in the management area on the optical disc.

In the recording apparatus, the second text information (IT_TXT) is expressed in the same language as that of the first text information (PRM_TXTI).

Alternatively, in the recording apparatus, the second text information (IT_TXT) is expressed in a different language from that of the first text information (PRM_TXTI).

Furthermore, in the recording apparatus, the second and third recording means (ST2, ST3) record in such a manner that a search using the first text information (PRM_TXTI) has priority of search over a search using the second text information (IT_TXT) (in FIG. 10, ST25 using IT_TXT is after the process at ST18 using PRM_TXTI).

To accomplish the third object, a reproducing apparatus according to the present invention uses an optical disc (10) having a management area (RTR_VMG in FIG. 13E) and a data area (1012 to 1016 in FIG. 13D) in which one or more programs have been recorded, the management area (RTR_VMG) including a sequence management table (ORG_PGCI or UD_PGCIT) for managing the sequence of the programs and a program management table (PGI) for managing the programs.

The reproducing apparatus comprises: an input section (120 in FIG. 1, ST23 in FIG. 10) for inputting at least one of video-recording date and channel number as text information (TEXT in FIG. 12); a retrieving section (101 in FIG. 1, ST16 in FIG. 10) for retrieving a program (the program NONFICTION in FIG. 11 or 12) to be reproduced by comparing the inputted text information (TEXT=video-recording date and/or channel number) with primary text information (PRM_TXTI) recorded in the program management table (PGI); a selecting section (101 in FIG. 1, ST19 in FIG. 10) for selecting one (TEXT in FIG. 12) of the pieces of the text information (video-recording date and time lists 1 to 3 in FIG. 11) about the retrieved program (NONFICTION) to be reproduced; and a reproducing section (101 to 106 in FIG. 1, ST20 in FIG. 10) for reproducing the data for the program (NONFICTION) corresponding to the selected piece of the text information (TEXT in FIG. 12).

The reproducing apparatus further comprises a second retrieving section (101 in FIG. 1, ST25 in FIG. 10) for retrieving a program using text information different from the primary text information (PRM_TXTI).

In the reproducing apparatus, a search using the primary text information (PRM_TXTI) has priority over a search using the different text information (IT_TXT) (in FIG. 10, ST25 using IT_TXT is after the process at ST18 using PRM_TXTI).

The reproducing apparatus reproduces the first text information (PRM_TXTI) from the optical disc (101 to 106 in FIG. 1, ST15 in FIG. 10).

The reproducing apparatus reproduces the second text information (IT_TXT) from the optical disc (101 to 106 in FIG. 1, ST25 in FIG. 10).

Furthermore, the reproducing apparatus reproduces the contents of records (TXTDT_MG in FIG. 4, PGI, CI in FIG. 6) in the management area (RTR_VMG) from the optical disc (101 to 106 in FIG. 1, ST11 in FIG. 10).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a table to help explain a file format in storing data on an optical disc;

FIG. 5 is a table to help explain the contents of a text data language unit search pointer (differing from the example of TXTDT_LU_SRP in FIG. 4(c));

FIG. 7 is a table to help explain the contents of cell playback information (C_PBI/CI);

FIG. 8 is a table to help explain the contents of program information (PGI);

DETAILED DESCRIPTION OF THE INVENTION

Hereinafter, referring to the accompanying drawings, an optical disc recording/reproducing apparatus according to an embodiment of the present invention will be explained.

A typical embodiment of the optical disc recording/reproducing apparatus is an apparatus for recording and reproducing moving pictures (or AV data) encoded according to the MPEG-2 standard onto and from an optical disc 1 at a variable bit rate, such as a DVD digital video recorder. (A concrete example of the DVD digital video recorder will be explained later.)

As shown in FIG. 2, on the optical disc 1, data is stored in a normal file format. A title corresponds to one film. One disc contains more than one title. A collection of titles is called a title set. A title set is composed of plural files.

On a single optical disc 1, there is a file called a video manager Video Manager (hereinafter, referred to as VMG) as information used to manage the optical disc 1.

In the video title set (hereinafter, referred to as VTS), information used to manage the title set is composed of a Video Title Set Information (hereinafter, referred to as VTSI) management file, a video file made up of video data, and a VTSI backup file.

For example, in a DVD video directory, VMG management data (VMGI) is composed of VMG menu video data (VMGM_VOBS), VMGI backup (VMGI), VTS management data (VTSI), VTS menu video data (VTSM_VOBS), VTS video data (VTSTT_VOBS), and VTSI backup (VTSI).

Figure 3:
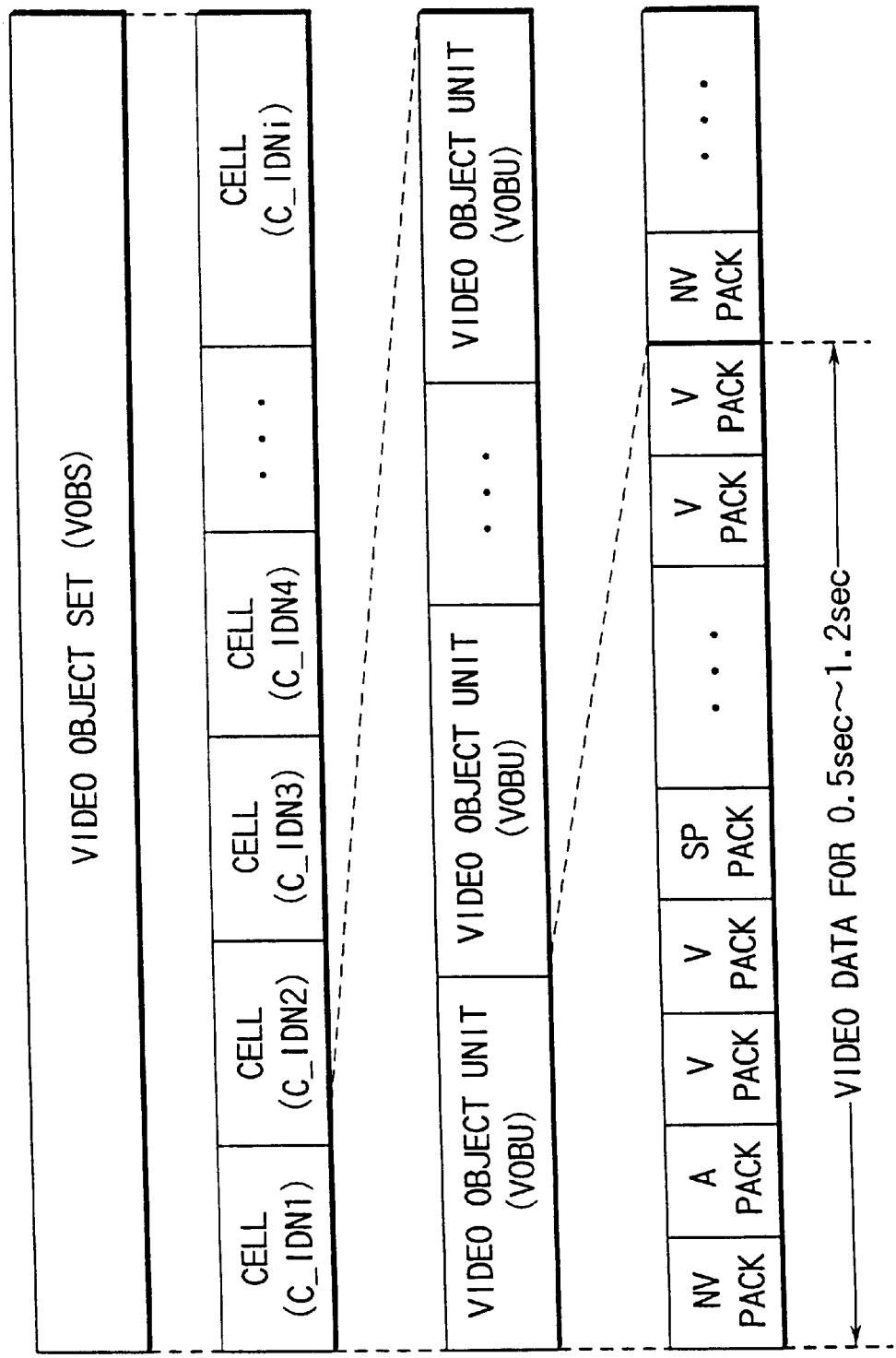
FIG. 3 is a diagram to help explain a hierarchical structure of the information stored on an optical disc.

As shown in FIG. 3, the video file has a hierarchical structure. One file is composed of program chains. One program chain is composed of programs. One program is composed of cells. One cell corresponds to video object units (hereinafter, referred to as VOBUs). A VOBU is composed of packs consisting of various types of data. A pack is composed of one or more packets and a pack header.

There are three types of packs: video packs (V packs) in which moving picture and still picture data have been recorded, sub-picture packs (SP packs) in which sub-picture data has been recorded, and audio packs (A packs) in which audio data has been recorded.

The pack is the smallest unit in data transfer. The smallest unit in logical processing is a cell. Logical processing is done in cells.

The playback time of the video object unit VOBU corresponds to the playback time of the video data made up of more than one video group (Group of Picture, which is abbreviated as GOP) contained in the video object unit VOBU. The playback time is set to the range from 0.4 second to 1.2 seconds. In the MPEG standard, the playback time of one GOP is normally about 0.5 second. One GOP contains screen data compressed so that about 15 pictures may be reproduced in about 0.5 second.

When a video object unit VOBU includes video data, GOPs (complying with the MPEG standard) composed of video packs, sub-picture packs, and audio packs are arranged to produce a video data stream.

Even when the playback data contains only audio and/or sub-picture data, it is constructed using a video object unit VOBU as one unit. For example, when a video object unit VOBU is made up of only audio packs, the audio pack to be reproduced within the playback time of the video object unit VOBU to which the audio data belongs is stored in the video object unit VOBU, as in the video object VOB of video data.

A navigation pack (NV pack) (usable as management information) may be added to the head of the GOP.

The navigation pack is not handled on a DVD real-time recording (DVD_RTR) apparatus.

Figure 4:
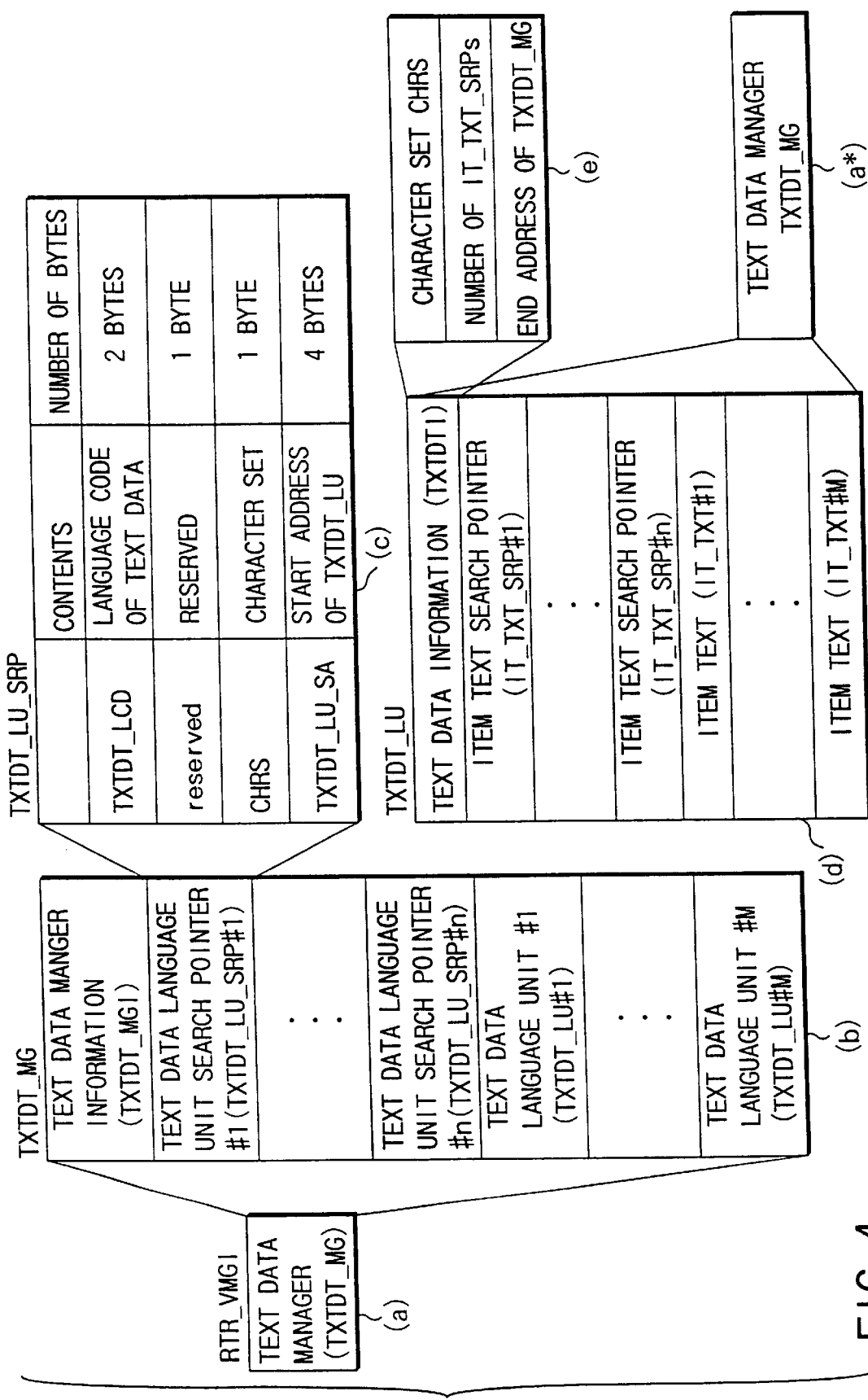
FIG. 4 is a diagram to help explain a hierarchical structure of the management data in video manager information (RTR_VMGI)

The VMG management data (VMGI) includes a text data manager TXTDT_MG which writes pieces of information, including a title name for title, an album name, and a producer name, in text form as shown in FIG. 4(*a*).

In the text data manager TXTDT_MG, the following items are recorded as shown in FIG. 4(*b*): text data manager information TXTDT_MGI in which an identifier used to identify TXTDT_MG, its number, and its end address are written, text data language unit search pointers TXTDT_LU_SRP #1 to TXTDT_LU_SRP #n in which a language code for each language is written, and the contents of text data language units TXTDT_LU #1 to TXTDT_LU #n, each being a table of text data for each language.

The text data language unit search pointer TXTDT_LU_SRP, which contains eight bytes, includes a language code (TXTDT_LCD: two bytes) for text data, reserve (one byte), a character set (one byte), and a start address (TXTDT_LU_SA: four bytes) for a text data language unit as shown in FIG. 4(*c*).

In the text data language unit TXTDT_LU, the following items are recorded as shown in FIG. 4(*d*): text data information TXTDTI in which the number of IT_TXT_SRPs in TXTDT is written, item text search pointers (IT_TXT_SRP #1 to IT_TXT_SRP #n) in which a number used to identify the contents of IT_TXT and the start address of IT_TXT, and the contents of item texts (IT_TXT #1 to IT_TXT #M) written in character code.

The numbers 1 to M of the item texts (IT_TXT #1 to IT_TXT #M) make item numbers.

The text data language unit search pointer TXTDT_LU_SRP may contain ten bytes and, as shown in FIG. 5, include a language code (TXTDT_LCD: two bytes) for primary text data, reserve (one byte), a character set (one byte), and the start address (TXTDT_LU_SA: four bytes) for a text data language unit, and a language code (OPTION_TXTDT_LCD: two bytes) for other text data.

In the management data (VTSI) in the VTS, the following items are recorded as shown in FIG. 6(a): the contents of a video title information manager table (VTSI_MAT) listing the start address of each piece of information in VTS and VTSI and the attributes of VOBS in VTS and the contents of a video title set program chain information table (VTS_PGCIT) in which VTS program chain information is written.

An order of playback of cells for program chains PGC can be determined by the contents (PGCI) of the video title set program chain information table (VTS_PGCIT).

The program chain PGC is a unit for executing a series of playback according to the specified playback sequence.

A cell CELL is a playback section where playback data is specified using a start address and an end address.

The program chain information table (VTS_PGCIT), as shown in FIG. 6(b), includes program chain information table information (PGCITI) in which the number of PGCI_SRPs and the end address of PGCIT, VTS_PGC program chain information search pointers (PGCI_SRP #1 to PGCI_SRP #n) in which the category of VTS_PGC and the start address of VTS_PGCI are written, and program chain information (PGCI #1 to PGCI #M).

The program chain information table information (PGCITI) includes information indicating the number of program chains PGCS. The program chain information search pointer (PGCI_SRP) points at the head of each piece of program chain information PGCI and makes it easy to search.

The order of the pieces of program chain information PGCI is set, regardless of the order of the program chain information search pointers PGCI_SRP #1 to PGCI_SRP #n. This enables one or more program chain information search pointers PGCI_SRPs to point at the same piece of program chain information PGCI.

The program chain information (PGCI), as shown in FIG. 6(c), is composed of program chain general information (PGC_GI) in which the playback time of program chains PGCs and the number of cells are written, a program chain command table (PGC_CMDT) in which commands for program chains are written, a program chain program map (PGC_PGI) in which a map representing the structure of the programs in a program chain is written, a cell playback information table (C_PBIT) in which a table to define the playback sequence of cells in a program is written, and a cell position information table (C_POSIT) in which VOBID numbers of the cells used in a program and cell ID numbers are written.

In the cell playback information table (C_PBIT), cell playback information (C_PBI #1 to C_PBI #j) are written as shown in FIG. 6(d).

FIG. 7 shows the contents of cell playback information C_PBI (C_PBI #1 to C_PBI #j) of FIG. 6(d). Specifically, each piece of cell playback information (C_PBI), which contains 54 bytes, includes a cell category (C_CAT: four bytes), cell playback time (C_PBTM: four bytes), the start address (C_FVOBU_SA: four bytes) of the first video object unit (VOB) in a cell, the end address (C_FVOBU_EA: four bytes) of the first video object unit (VOBU) in the cell, the start address (C_FVOBU_SA: four bytes) of the last video object unit (VOB) in the cell, the end address (C_FVOBU_EA: four bytes) of the last video object unit (VOBU) in the cell, primary text information (28 bytes) composed of video-recording start date and time, video-recording end date and time, source name, and TV channel number, and the TEXT item number (ITEM Number OF TEXT: two bytes) in text data manager TXTDT_MG in VMGI as shown in FIG. 7.

The program chain program map (PGC_PGI) is composed of pieces of program information #1 to #i as shown in FIG. 6(e).

FIG. 8 shows the contents of the program information shown in FIG. 6(e). Specifically, the program information, which contains 32 bytes, includes an entry cell number (EN_CN: one byte), primary text information (28 bytes) composed of video-recording start date and time, video-recording end date and time, source name, and TV channel number, and the TEXT item number (ITEM Number OF TEXT: two bytes) in text data manager TXTDT_MG in VMGI.

The primary text information is used to record information on video-recording, the information contained in the blanking period of a video signal, and pieces of information in the electronic TV guide information (as found in satellite broadcasting) or the like and retrieve the recorded video data.

For the primary text information, pieces of information considered essential may be video-recording start date and time, source name, and TV channel number. The presence of these pieces of information enables the user to specify a TV program. On the other hand, in a case of video camera recording or still camera recording, by knowing the recording date and time, the user can determine where the picture was taken or recoded. Therefore, those pieces of information may also be used as primary text information.

The primary text information can be created within the optical disc recording/reproducing apparatus (video-recording/reproducing system). What carries out the work is a determination unit of primary text information, which will be explained later.

Being written and recorded in the ASCII code, those pieces of the primary text information can be generated easily in the optical disc recording/reproducing apparatus. This is a function applicable to a low-cost machine on a firmware basis. Representation in English enables use in major countries in the world. A method of specifying the language code for the primary text information and then recording it can be considered.

Furthermore, the following data can be considered as other text information: the text data superimposed in a video blanking period in ground-wave broadcasting, and data other than the subtitle data in the text information, such as program information, in the electronic TV guide information in digital broadcasting, such as satellite broadcasting. The data other than the subtitle data includes the title name, the names of the performers, the program review, the historical background, and a description of accessories used in the program. Although not text information, HTML data can also be recorded in a similar manner.

Thus, the other text information may be recorded according to the DVD text INF format. In the case of HTML data, the language code is set to "FFFF."

Of those data items, the text information known before the video data recording is recorded and then video-recording is started.

The text information taken in during recording is stored in a memory (a text buffer explained later) temporarily. After the recording has been completed, the test information is recorded.

At this time, a language code detector explained later senses the language name and text code name in the text information, records the sensed language name and text code name into a text information management area, and thereafter records the text information in a text information area.

Here, the following two cases can be considered: a case where the primary text information and TEXT item numbers are recorded on a cell (CELL) basis and a case where they are recorded on a program (PG) basis. When recording is done on a CELL basis, the primary text information and TEXT item numbers are recorded in C-PBI as shown in FIG. 7. When recording is effected on a PG basis, they are recorded in the program information in PGI.

Figure 1:
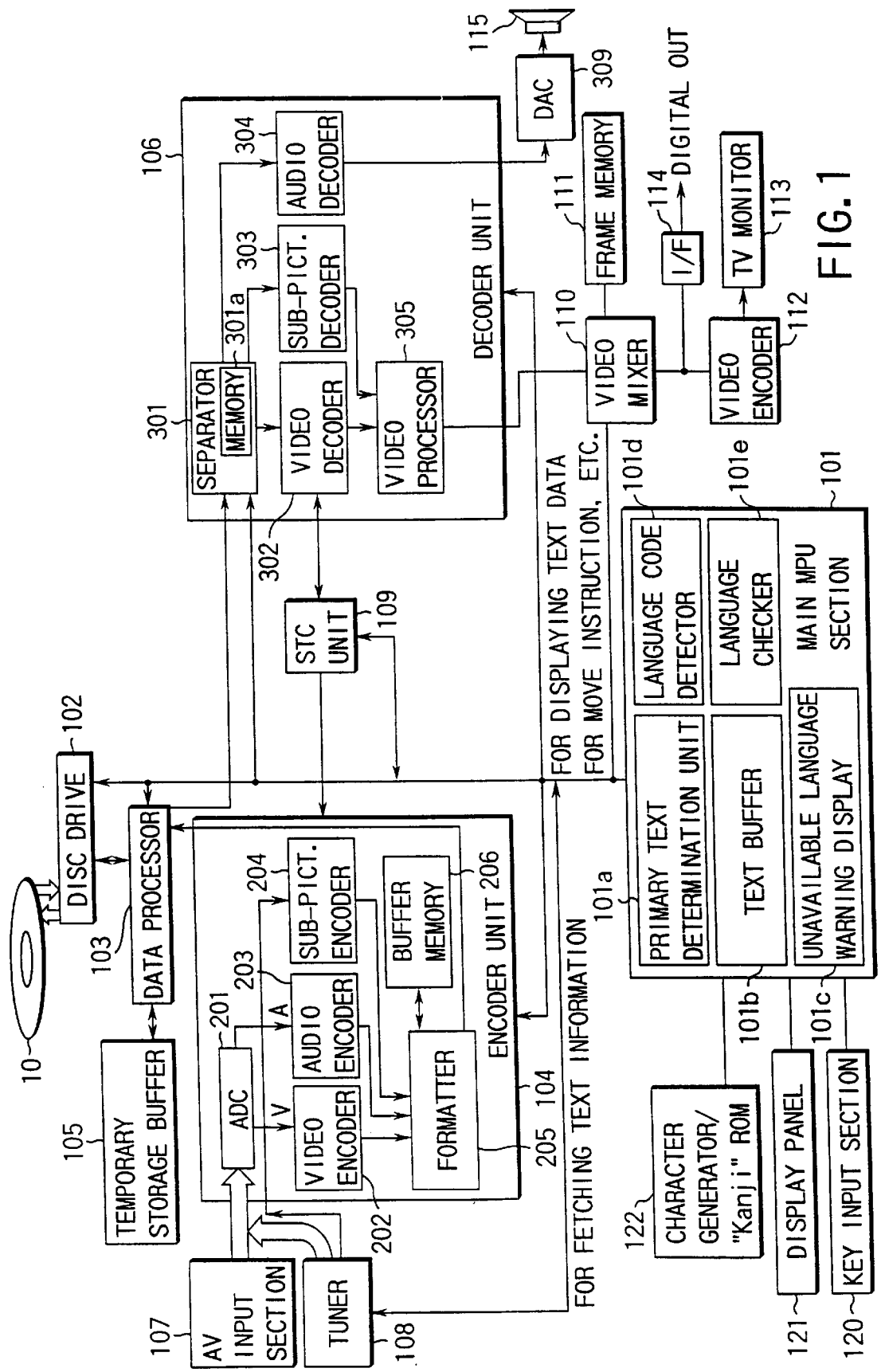
FIG. 1 is a block diagram showing the configuration of an optical disc recording/reproducing apparatus according to an embodiment of the present invention.

FIG. 1 shows an example of the configuration of the optical disc recording/reproducing apparatus (e.g., DVD video recorder) for recording and reproducing digital moving picture information onto and from an optical disc 1 using the data structures as explained in FIGS. 2 to 8.

In the optical disc recording/reproducing apparatus, the following devices act on the optical disc 1 serving as a recording medium. First, a main microprocessor section (hereinafter, referred to as a main MPU section) 101 is a section for supervising the operation of the entire recording/reproducing apparatus.

A disc drive 102 includes the function of controlling the rotation of the optical disc 1, the reading of data from the optical disc 1, and the writing of data onto the optical disc 1 under the control of the main MPU section 101. Control of the rotation of the optical disc 1 is performed via the servo mechanism of a disc motor. The writing of data onto the optical disc 1 and the reading of data from the optical disc 1 are realized via a pickup device.

A data processor 103 adds an error correction code to the data in units of 16 sectors to record the recording data from an encoder unit 104 onto the optical disc 1 in a recording operation, produces a recording signal by modulation, and supplies the resulting signal to the disc drive 102. A temporary storage buffer 105 is connected to the data processor 103 and used to temporarily store more than several minutes of recording data in high-speed access.

The data processor 103 receives a playback signal from the disc drive 102 in a playback operation, demodulates the signal, performs an error correction process, and sends the demodulated signal to a decoder unit 106.

An external input is supplied to the encoder unit 104. An audio/video (AV) input section 107 can supply an audio signal and a video signal and a tuner 108 also can supply an audio signal and a video signal. Since there may be character information or closed caption data as the information in a vertical blanking period, the tuner 108 can input these data items to the encoder unit 104.

The audio signal and video signal are supplied to an analog/digital (A/D) converter 201 in the encoder unit 104. The video signal digitized at the A/d converter 201 is inputted to a video encoder 202, whereas the audio signal is inputted to an audio encoder 203. The character information and closed caption data are inputted to a sub-picture (SP) encoder 204. The encoded video data, audio data, and sub-picture data are inputted to a formatter 205, which organizes these data into packets and packs for recording. At this time, a buffer memory 206 is used for temporary storage.

The encoders 202, 203, 204 refer to a system time clock acting as a reference of time for all of the files and, according to the value, determine a presentation time stamp (PTS) and a decoded time stamp (DTS) for each packet. The system time clock is generated by a system time clock (STC) unit 109.

To further add the necessary information in playback, the formatter 205 may perform an alignment process of packs in each specific interval (e.g., GOP) of video (e.g., the playback time ranges from about 0.5 to 1.2 seconds) and add a navigation pack (NV pack) (usable as management information) to the head of a GOP.

The data processor 103 records the addresses of the NV packs ahead and behind in a data area for a fast-forward and rewind of data in NV packs, and the other necessary management data in a management area.

The decoder unit 106 receives a pack train of playback data from the data processor 103. The pack train is supplied to a separator 301. The separator 301 judges each pack and transfers video packets to a video decoder 302, sub-picture packets to a sub-picture (SP) decoder 303, and audio packets to an audio decoder 304.

NV packs are stored one after another in the internal memory 301a of the separator 301 so that the main MPU section can access them at any time.

When the separator 301 transfers each packet to the corresponding decoder, PTS or DTS is sent with specified timing to the system time clock unit 109, which loads it therein and sets a reference time for the entire system. For example, the main MPU section 101 loads PTS in a NV pack into the system time clock unit 109 or the video decoder 302 automatically sets DTS or PTS for the video data in the system clock unit 109.

After the setting, each decoder compares PTS in a packet with the system clock and performs a decoding and reproducing process, while keeping the synchronizing state.

The video data decoded at the video decoder 302 and the sub-picture data decoded at the sub-picture decoder 303 are inputted to a video processor 305, which combines them.

A video mixer 110 mixes the output of the video processor 305 with the character data and others stored in the frame memory 111. Thereafter, the resulting signal is converted by a video encoder 112 into an NTSC signal (or PAL signal), which is supplied to a display (TV monitor) 113. In addition, the output of the video mixer 110 is designed to be taken out as digital output through an interface 114.

The output of the audio decoder 304 is converted by a digital/analog (D/A) converter 309 and the resulting signal is supplied to an audio output section (speaker) 115.

Connected to the main MPU unit 101 are a key input section 120, such as a keyboard, composed of a PLAY (playback) key, a REC (video-recording) key, a STOP key, and others, a display panel 121, and a character generator or kanji ROM 122 for displaying text information. The character generator or kanji ROM 122 converts a text code (character code) in the text information into a character pattern (or font data). For example, a specific language code has been set in the character generator or kanji ROM 122. The language code is used to convert text codes into character patterns in any one of various languages, including alphanumeric characters, kanji characters, Hangul characters, and Arabic characters. The set language code is managed by the main MPU section 101.

The main MPU section 101 not only manages the entire apparatus comprehensively but also performs edit control.

The main MPU section 101 includes a primary text determination unit 101a, a text buffer 101b, an unavailable language warning display 101c, a language code detector 101d, and a language checker 101e.

The primary text information determination unit 101a generates, as primary text information, information (video-recording start date and time, source name, and TV channel number) regarding video-recording from the tuner 108, the information sent during a blanking period, electronic TV guide information (as found in satellite broadcasting) and so on.

The text buffer 101b stores the text information temporarily.

The unavailable language warning display 101c not only displays the absence of the relevant data when it is judged from the data from the language checker 101e that there is no data corresponding to the language, but also gives a warning to the user on the display 113 where there is no text data from the tuner 108 acting as the other text information retrieval unit.

The language code detector 101d detects the language name and text code name in the text information, records the detected language name and text code name into the area (see FIG. 4(c)) for the language code (TXTDT_LCD) for text data in the text data language unit search pointer TXTDT_LU_SRP serving as the text information management area, and thereafter records the text information into the area (see FIG. 4(d)) for item text (IT_TXT) in the text data language unit TXTDT_LU serving as the text information area.

The language checker 101e reads the language code corresponding to the primary text information about each of the retrieved (or searched) programs or cells on the basis of the text item number and checks to see if the language code coincides with the language code of the apparatus.

The main MPU unit 101 converts the character code corresponding to the text information into font data and develops the font data on the frame memory 111. The video mixer 110 mixes the resulting data with decode data (or DVD video data). Then, the video encoder 112 converts the mixed data into an NTSC signal (or PAL signal), which is displayed on the TV monitor 113 or the like.

Although retrieval data (search data) is inputted from the key input section 120, the same thing may be done from only a pointing device (in the case of a type where a keyboard icon is displayed on the TV screen and characters are chosen by the icon keyboard on the screen), taking account of use at home.

Figure 9:
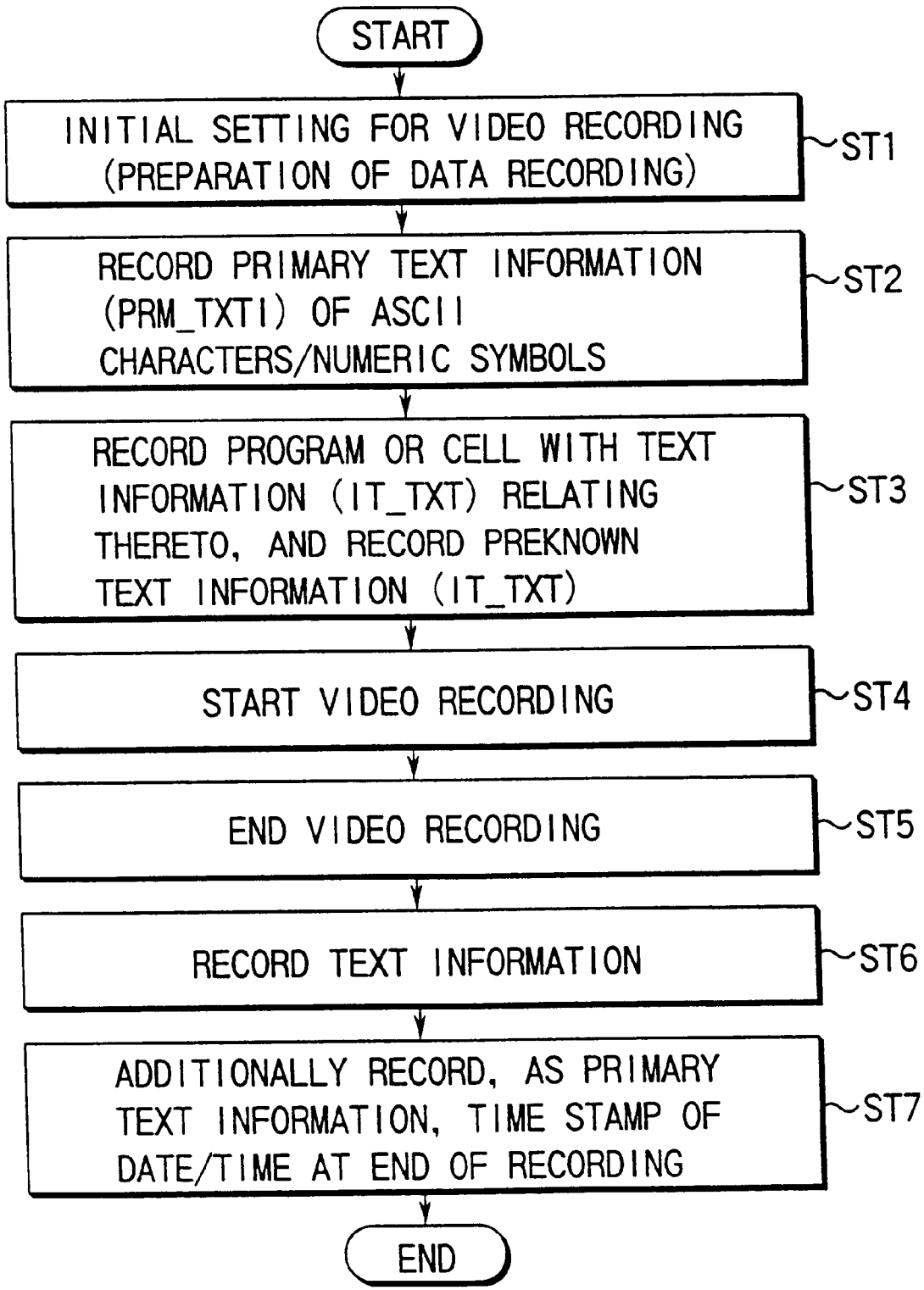
FIG. 9 is a flowchart to help explain a data process in video-recording.

Next, the data processing in video-recording will be described by reference to a flowchart shown in FIG. 9.

First, when receiving a video-recording instruction, the main MPU section 101 reads the management data from the disc drive 102 and determines a writing area. Then, the MPU section 101 sets the management area so that the determined area may be written into and sets the write start address of the video data in the disc drive 102, thereby preparing for data recording (step ST1).

Next, the main MPU section 101 resets the time of the STC unit 109. The STC unit 109 is a system timer. Video-recording and playback are done on the basis of the value of the timer. The main MPU section 101 further effects other various setting.

Thereafter, the main MPU section 101 causes the primary text information determination unit 101a to produce primary text information in alphanumeric characters from the video-recording start date and time, source name, and TV channel name, supplied as information on video-recording from the tuner 108. The MPU section 101 records the primary text information in cell playback information (C_PBI) shown in FIG. 6(d), when the primary text information is recorded cell by cell, and records it in the program information shown in FIG. 6(e), when it is recorded program by program (step ST2).

Furthermore, the main MPU section 101 records the text information known before recording in the area for item text (IT_TXT) in the text data language unit TXTDT_LU in the text data manager in VMGI (step ST3). When the language code is known, the MPU section 101 records the language code in the area for the language code (TXTDT_LCD) for the text data in the text data language unit search pointer TXTDT_LU_SRP (step ST3).

The flow of the video signal in video-recording is as follows.

First, the AV signal inputted from the tuner 108 or AV input section is A/D converted by the A/D converter 201. The video signal is inputted to the video encoder 202. The audio signal is inputted to the audio encoder 203. The tuner 108 inputs the closed caption signal or the text signal for the subtitle data in teletext or the like to the SP encoder 204. The text information other than the subtitle data is transferred to the main MPU section 101. When receiving the text information other than the subtitles, the main MPU section 101 stores the text information in the text buffer 101b temporarily and records it at the end of the video-recording.

Each of the encoders 202, 203, 204 compresses the signal and separated into packets (here, the data is separated into packets in such a manner that each pack contains 2048 bytes when the data is packed). The resulting data is inputted to the formatter 205. Here, the decoders 202, 203, 204 determine PTS and DTS for each packet according to the value of the STC unit 109 as the need arises, and record them.

The formatter 205 records the packet data into the buffer memory 206 temporarily, and thereafter packs each of the inputted packet data items, mixes them GOP by GOP, adds an NV pack to the head of the GOP, and inputs the resulting set of packs to the data processor 103.

The data processor 103 puts together the packs in units of 16 packs into ECC groups, puts ECC to them, and sends them to the disc drive 102. when the disc drive 102 is not ready to record data onto the optical disc 1, the data processor 103 transfers the ECC groups to the temporary storage buffer 105 and waits for the disc drive 102 to be ready to r ecord data. When being ready for recording, the disc drive 102 starts recording (step ST4).

Here, the temporary storage buffer 105 is assumed to have a large memory capacity, because it holds several minutes of recording data in high-speed access.

At the end of video-recording, the address data a bout each NV pack is recorded in the fast-forward and rewind data part in each NV pack, and the information necessary after the video-recording is recorded in the management area, which completes the video-recording operation (step ST5).

The main MPU section 101 is capable of reading and writing data from and into the data processor 103 via a bus to read and write data from and into the file management area.

At the end of the video-recording, the main MPU section 101 records the text information reordered in the text buffer 101b into the area (see FIGS. 4(a), (b), and (d)) for the item text (IT_TXT) in the text data language unit TXTDT_LU in the text data manager in VMGI (step ST6).

In addition, the main MPU section 101 records the language code into the area (see FIGS. 4(a), (b), and (d)) for the language code (TXTDT_LCD) in the text data in the text data language unit search pointer TXTDT_LU_SRP (step ST6). It also records other management data.

At the end of the video-recording, the main MPU section 101 records the video-recording end date and time as primary text information into the cell playback information C_PBI shown in FIG. 6(d) or into the program information shown in FIG. 6(e) (step ST7).

Figure 6:
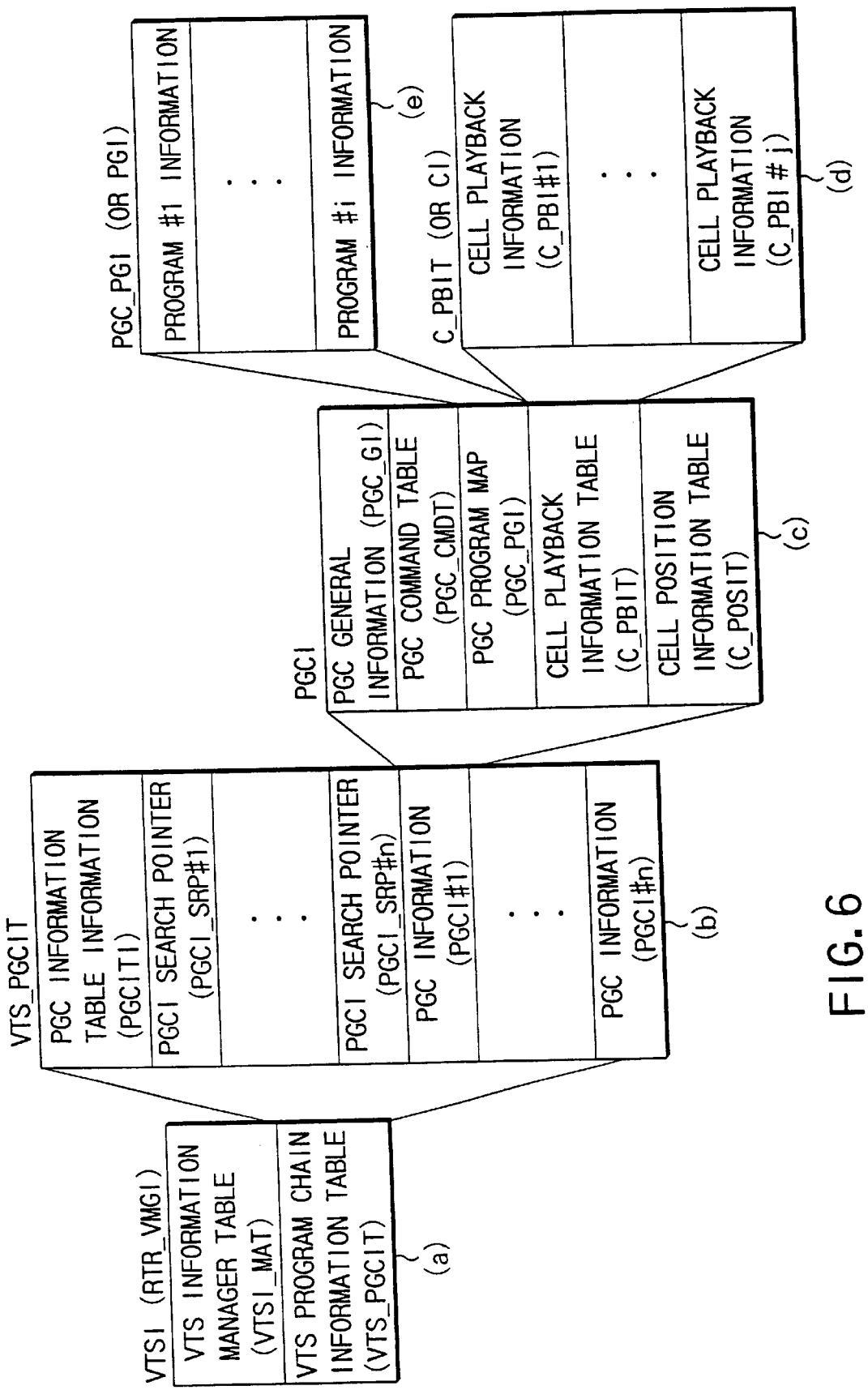
FIG. 6 is a diagram to help explain a hierarchical structure of the management data in video title set information (VTSI/RTR_VMGI)

At this time, to relate the primary text information to the program in which the text information has been recorded, the main MPU section 101 records the item text number indicating the position in which the text information has been recorded into the cell playback information C_PBI shown in FIG. 6(d) or into the program information shown in FIG. 6 (3) (step ST7).

Next, the data processing in playback will be explained.

First, when receiving a playback instruction, the main MPU section 101 reads the management area from the disc drive 102 via the data processor 103 and determines the address to be reproduced. Then, the main MPU section 101 sends the address for the determined data to be reproduced and a read instruction to the disc drive 102.

The disc drive 102 reads the sector data from the optical disc 1 according to the received read instruction. Then, the data processor 103 performs error correction and sends the resulting data in pack data form to the decoder unit 106.

In the decoder unit 106, the separator 301 receives the read-out pack data, separates the data into packets. According to the purpose of the data, the separator 301 transfers the video packet data (MPEG video data) to the video decoder 302, the audio packet data to the audio decoder 303, and the sup-picture packet data to the SP decoder 303. In addition, the separator 301 stores the NV packs into an internal memory to enable the main MPU section 101 to process them in such a manner that the main MPU 101 can access them at any time.

The PTS in each of the sent packet data items is loaded into the STC unit 109 at the time of transfer start (that is, the main MPU section 101 sets the PTS in an NV pack into the STC unit 109, or the video decoder 302 automatically sets the PTS in the video data into the STC unit 109). Thereafter, each of the decoders 302, 303, 304 carries out a playback process in synchronization with the value of the PTS (Presentation Time Stamp) in the packet data (while comparing the PTS with the value of the STC unit 109), thereby reproducing moving pictures with subtitles on the TV monitor 113. The presentation of the playback time during playback shows the playback time data in the NV pack in DVD-ROM video.

Figure 10:
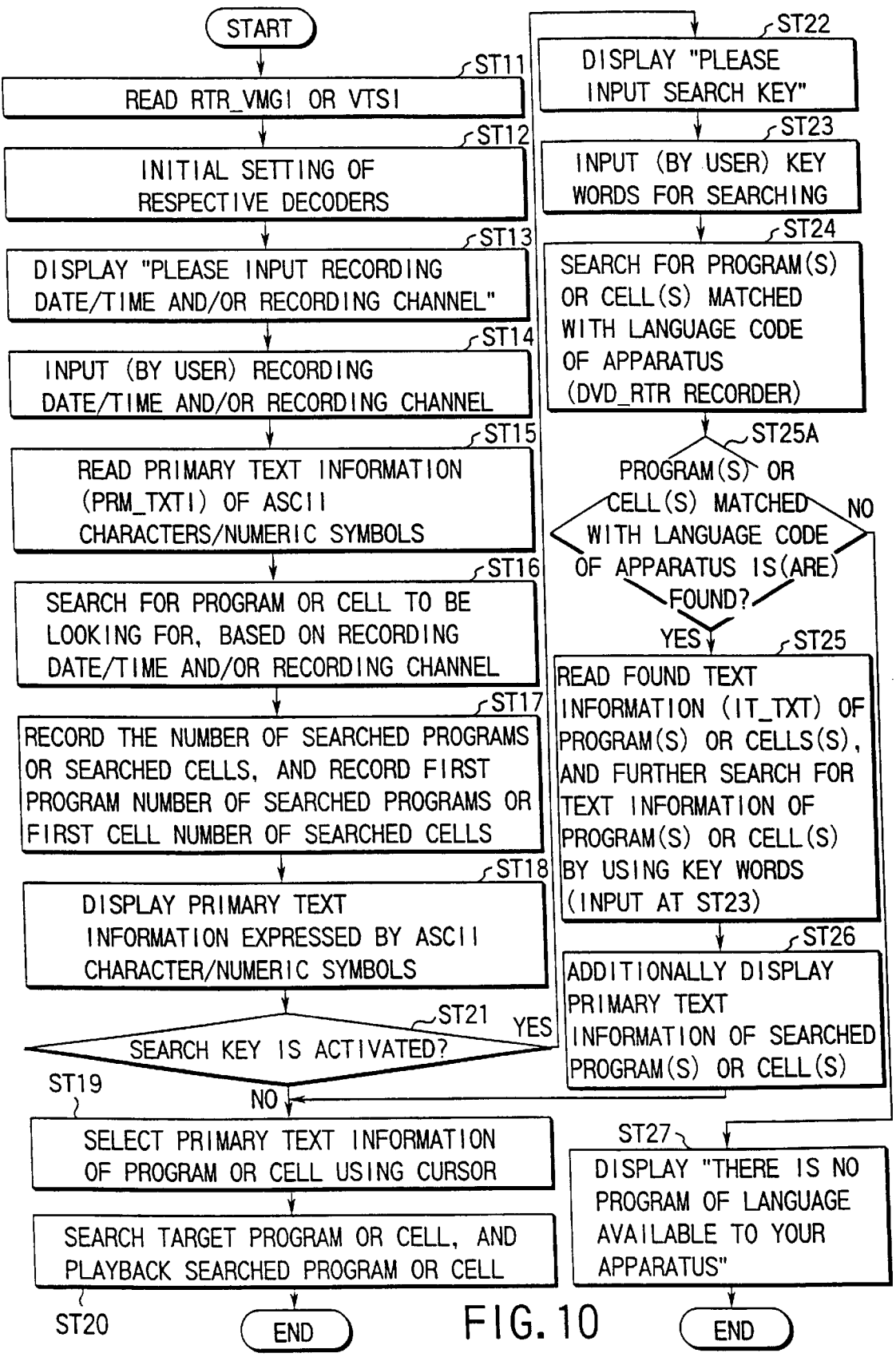
FIG. 10 is a flowchart to help explain a program retrieval process using text information.

Next, the process of retrieving a program using the text information will be described by reference to a flowchart shown in FIG. 10 and examples of display shown by 113a to 113f in FIG. 11.

First, when the user presses a menu search key in the key input section 120, the main MPU section 101 judges the menu retrieval mode and reads VTSI from the optical disc 1, using the disc drive 102 and data processor 103 (step ST11). on the basis of the read VTSI, the main MPU section 101 effects the initial setting of each of the decoders 302, 303, 304 (step ST12).

Figure 11:
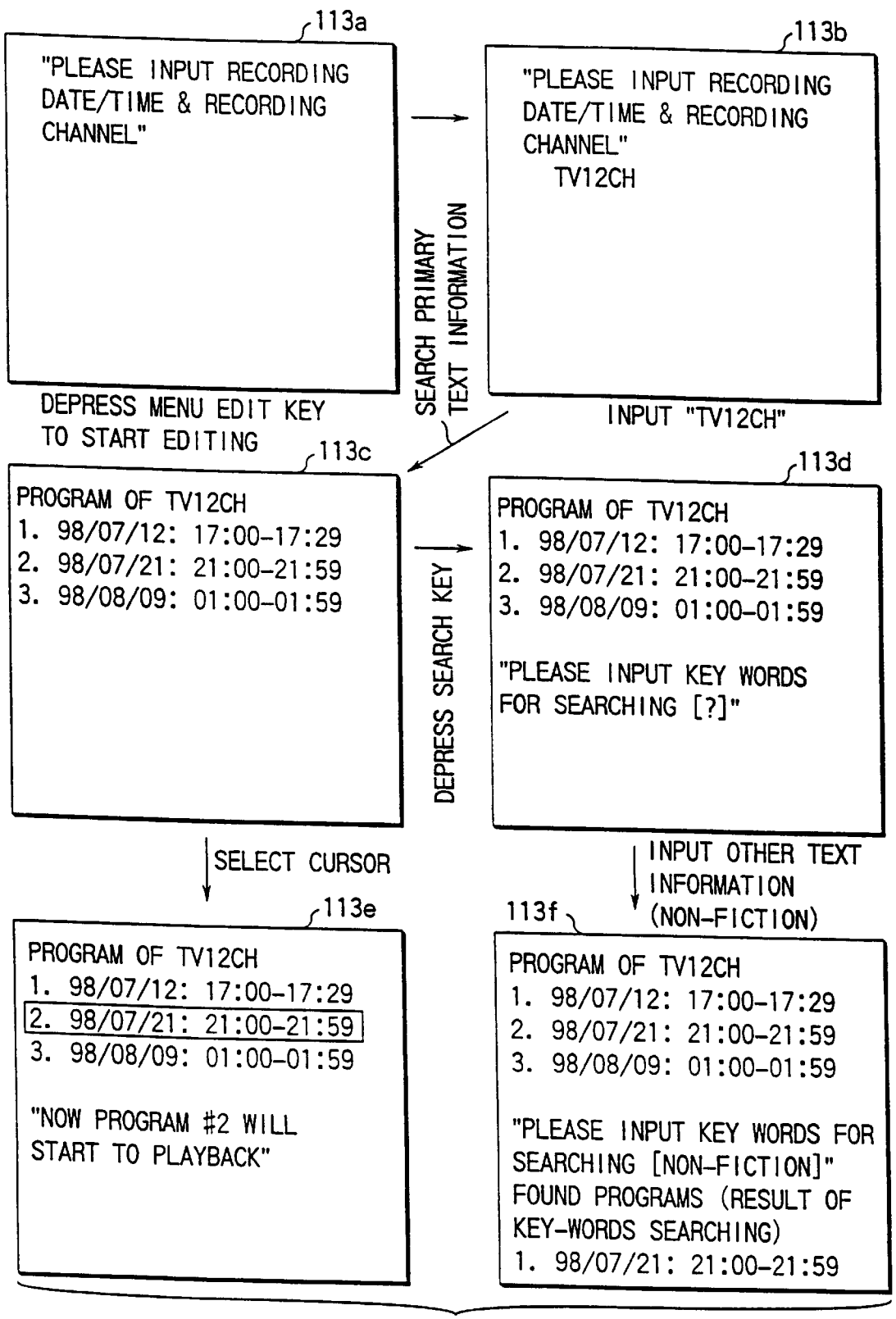
FIG. 11 shows examples of display in the program retrieval process using text information.

Additionally, the main MPU section 101 displays a retrieval initial screen on which the message that "ENTER VIDEO-RECORDING DATE AND TIME AND CHANNEL NUMBER" as shown by 113a in FIG. 11 (step ST13).

According to the guide on the screen, the user enters the video-recording date and time and channel numbers (step ST14).

Instead of those items, the user may enter the video-recording time or source name (i.e., the TV channel number, satellite channel number, or camera input). The main MPU section 101 displays the contents of the input (e.g., TV channel 12) on the TV monitor 113 as shown by 113b in FIG. 11.

When the video-recording date and channel number have been entered, the main MPU section 101 causes the primary text determination unit 101a to read the alphanumeric priority text information written for each program or cell (in the cell playback information C_PBI in FIG. 6(d) or in the program information in FIG. 6(e)) (step ST15).

Then, the priority text determination section 101 retrieves or searches the corresponding program or cell according to the entered video-recording date and channel number (step ST16).

Then, the main MPU section 101 stores the number of programs or cells retrieved by the primary text determination unit 101a and the first sensed program number or cell number (step ST17).

Thereafter, the main MPU section 101 reads the primary text information written in alphanumeric characters in the programs or cells retrieved by the primary text determination unit 101a and displays it on the TV monitor 113 as shown by 113c in FIG. 11 (step ST18).

In this case, for programs on TV channel 12, the following are displayed: 1. Jul. 12, 1998, 17:00–17:29, 2. Jul. 21, 1998, 21:00–21:59, 3. Aug. 9, 1998, 1:00–1:59.

If the search key is not pressed (NO at step ST21) in the display state at step ST18, control proceeds to step ST19.

Here, if the primary text information in a program or cell is chosen by the cursor (step ST19), the main MPU section 101 searches for the target program or cell and goes to a playback process (step ST20).

Specifically, when number 2 is chosen, the main MPU section 101 additionally displays the guide message "PROGRAM NO. 2 IS GOING TO BE REPRODUCED" as shown by 113e in FIG. 11 and proceeds to the process of reproducing program No. 2 or cell No. 2.

If the search key is pressed (YES at step ST21) in the display state at step ST18, control goes to step ST22.

When the search key is pressed, the main MPU section 101 displays the guide message "ENTER THE CHARACTERS TO BE SEARCHED FOR" on the display 113 as shown by 113d in FIG. 11 (step ST22).

Following the guide, the user enters a keyword, or the characters to be searched for, from the key input section 120 (step ST23).

When the keyword has been entered, the main MPU section 101 causes the language code detector 101d to read the language code (recorded in the area for the language code (TXTDT_LCD) in the text data in the text data language unit search pointer TXTDT_LU_SRP) on the basis of the text item number corresponding to the primary text information in each of the retrieved programs or cells (or on the basis of the text item number recorded in the cell playback information C_PBI of FIG. 6 (d) or in the program information of FIG. 6 (e) so as to correspond to the primary text information). Then, the main MPU section 101 causes the language checker 101e to search for a program or cell that corresponds to the language code of the apparatus (step ST24).

As a result of the search, if a program or cell that coincides with the language code of the apparatus has been found (YES at step ST25A), the main MPU section 101 reads the text information corresponding to the program or cell that coincides with the language code and makes a search using the keyword (stet ST25).

As a result of the search, the main MPU section 101 additionally displays the primary text information in the program or cell coinciding the language code on the TV monitor 113 (step ST26).

For example, when the user enters "NONFICTION" on the input screen for characters to be searched for, the main MPU section 101 additionally displays the primary text information "Jul. 21, 1998, 21:00–21:59" corresponding to the text information "NONFICTION" on the TV monitor 113 as shown by 113f in FIG. 11.

In this state, control goes to the process of reproducing the program or cell corresponding to the selected primary text information.

At step ST24, if there is no program or cell that coincides with the language code of the apparatus (NO at step ST25A), the main MPU section 101 displays the guide message "NO PROGRAM IN THE CORRESPONDING LANGUAGE HAS BEEN FOUND" on the TV monitor 113 (step ST27).

As described above, when moving pictures are recorded on an optical disc, not only is text data is recorded, but also primary text data including the video-recording start date and time, the video-recording end date and time, and source name or channel number are recorded in alphanumeric characters for each program or cell as a unit of video-recording. Other text data is recorded together with the language code.

As a result, even when there are various languages for the text data in playback, since the primary text data including the video-recording start date and time, the video-recording end date and time, and the source name or channel number are expressed in alphanumeric characters, the program or cell to be reproduced on the basis of the video-recording start date and time, the video-recording end date and time, and the source name or channel number expressed in alphanumeric characters can be selected. Additionally, the text information in the same language code as that of the apparatus can be searched for.

When the text information in the same language code as that of the apparatus is searched for, a warning can be given to the user, if no text information in the same language code has been found.

Figure 12:
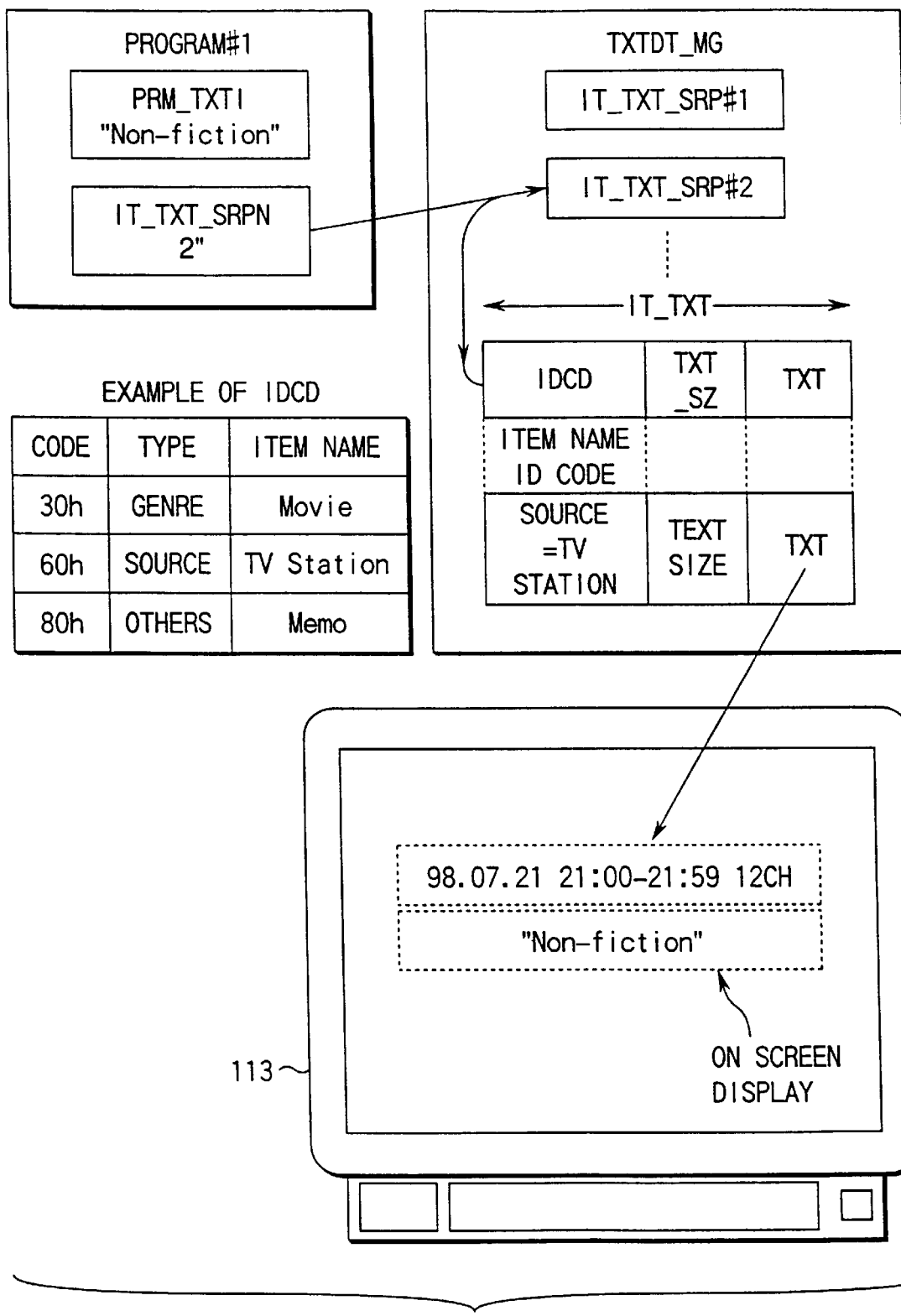
FIG. 12 shows an example of display using text information.

FIG. 12 shows an example of display using the text information.

It is assumed that, for example, a TV program with the title "NONFICTION" has been recorded on the optical disc (DVD_RTR disc) 10 of FIG. 1 as test information on program #1.

In addition, it is assumed that IT_TXT_SRPN "2" (=IT_TXT_SRP #2) has been recorded as a search pointer indicating the item text corresponding to program #1.

In this case, if the title of program #1 "NONFICTION" has been used as primary text information PRM_TXTI, the search pointer IT_TXT_SRP #2 is searched for on the basis of the text information "NONFICTION". Using the IT_TXT_SRP #2, the corresponding item text IT_TXT is read from the disc 10.

The item text IT_TXT has any one of the following structures:

(1) Identification code IDCD, text size TXT_SZ, and the body of text TXT.
(2) Identification code IDCD and text size TXT_SZ (here, TXT is abscent or TXT is optional).

FIG. 12 shows an example of the structure of item (1).

The identification code IDCD constituting the item text IT_TXT is composed of code, type, and item name.

The item name is used to represent a movie, a TV station (or radio station), a memo, or the like.

The type is used to represent a genre of movie, music, drama, or the like or a source of broadcasting station, camera, or the like.

The code is used to determine the item name and type.

For example, when the code is 60h, this means that the source of the corresponding program is "BROADCASTING STATION." When the code is 30h, this means that the genre of the corresponding program is "MOVIE."

In the example of FIG. 12, the information that the TV program "NONFICTION" on TV channel 12 recorded from 21:00 to 21:59, Jul. 21, 1998, was recorded as program #1 on the disc 10 has been displayed on the TV monitor 113.

FIG. 12 shows "98.07.21 21:00–21:59" as an example of the item text and the title of the program "NONFICTION" as an example of the primary text information. On the other hand, FIG. 11 shows a similar video-recording date as an example of the primary text information.

The reason why the example of FIG. 11 is made different from that of FIG. 12 is to provide various forms. A certain piece of text information (e.g., video-recording date and time information) is not necessarily limited to either the primary text information or the item text information.

Figure 13:
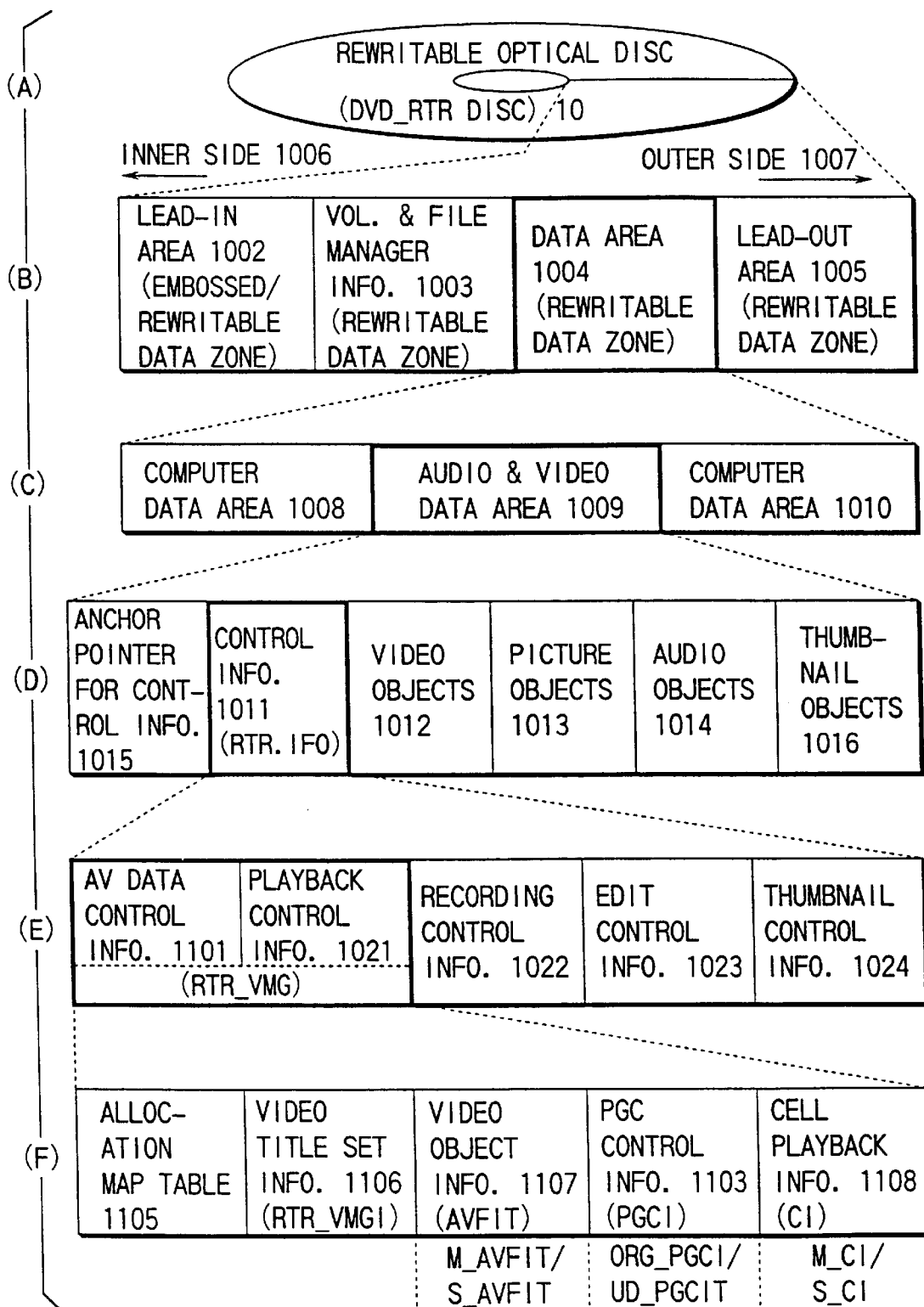
FIGS. 13(A) to 13(F) are diagrams to help explain the data structure of an optical disc according to an embodiment of the present invention.

One information recording medium that enables the recording and reproducing of video information or music information is a DVD_RTR disc (an optical disc using phase change) as shown in FIG. 13 (A). The DVD video recorder (DVD_RTR recorder) of FIG. 1 can use a disc with a structure as shown in FIG. 13.

The contents of the information (data structure) recorded on the disc 10 will be explained below.

FIG. 13 (B) shows a rough data structure of information recorded on the optical disc 10. In FIG. 13 (B), a lead-in area 1002, volume & file manager information 1003, a data area 1004, and a lead-out area 1005 are arranged in that order from the inner circumference side 1006 toward the outer edge of the optical disc 1001.

The lead-in area 1002 has an embossed data zone where the light reflecting surface is bumpy, a mirror zone where the surface is flat (mirrorlike), and a rewritable data zone where information can be rewritten.

The volume & file manager information 1003 is recorded in a rewritable data zone where the user can record or rewrite data. In the volume & file manager information, information on all of the audio & video data (AV data) files or volumes is stored.

The data area 1004 has a rewritable data zone where the user can record or rewrite data.

The lead-out area 1005 is made up of a rewritable data zone where information can be rewritten.

In the embossed data zone of the lead-in area 1002, the following pieces of information have been recorded beforehand:

Information on the disc type, such as DVD-ROM/DVD-RAM/DVD-R, the disc size, and the recording density, information on all of the information storage medium, including physical sector numbers indicating the recording start/recording end positions.

Information on recording, reproducing, and erasing characteristics, including the recording power, recording pulse width, erasing power, reproducing power, and linear velocity in recording or erasing.

Information on the manufacture of individual information storage mediums, including serial numbers.

Each of the rewritable zone in the lead-in area 1002 and that in the lead-out area 1005 has the following:

A unique disc name recording area for each information storage medium.

A trial recording area (for checking the recording and erasing conditions).

A management information recording area for defective areas in the data area 1004.

The information recording and reproducing apparatus can record information onto each of those areas.

In the data area 1004 sandwiched between the lead-in area 1002 and the lead-out area 1005, computer data and audio & video data (AV data) can be recorded in such a manner that they are intermingled as shown in FIG. 13 (C).

The order in which computer data and audio & video data are recorded and the recording information size of them are arbitrary. The areas in which computer data is recorded are called computer data areas 1008, 1010. The area in which audio & video data is recorded is called an audio & video data area 1009.

As shown in FIG. 13 (D), the data structure of information recorded in the audio & video data area 1009 includes the following:

Anchor pointer 1015 for control information, which is placed at the head of the audio & video data area 1009 and points at the start position (start address) in which the control information 1011 in the audio & video data area 1009 has been recorded.

Control information 1011 necessary to perform each of video-recording (audio-recording), reproducing, editing, and retrieving processes.

A video object 1012 of video-recording information on the contents of the video data.

A picture object 1013 of information on still pictures, including slide pictures.

An audio object 1014 of audio-recording information on the contents of the audio data.

A thumbnail object 1016 of-reduced image information, such as thumbnail information, used in editing when the desired part in the video data is searched for.

Each of the video objects 1012, picture objects 1013, audio objects 1014, and thumbnail objects 1016 shown in FIG. 13 (D) means a group of information classified by the contents of data.

Therefore, all the video information recorded in the audio & video data area 1009 is included in the video objects 1012, all the still picture information is included in the picture objects 1013, all the audio information is included in the audio objects 1014, and all the thumbnail information used for management and search of the video information is included in the thumbnail objects 1016.

As shown in FIG. 13 (E), the contents of the control information 1011 include the following:

AV data control information 1101, which controls the data structure of the video object 1012 and is management information about information on the recording position on an optical disc 10 serving as an information storage medium.

Playback control information 1021, which is control information necessary in playback.

Recording control information 1022, which is control information necessary in recording (video-recording and audio-recording).

Edit control information 1023, which is control information necessary in editing.

Thumbnail control information 1024, which is management information on thumbnails (thumbnail objects) for retrieving the desired portion of the video data or for editing.

The pieces of control information 1101, 1021 of FIG. 13 (E) correspond to RTR. IFO (VR_MANGR. IFO) of FIG. 14 and RTR_VMG of FIG. 17.

As shown in FIG. 3 (F), the data structure of the AV data control information 1101 of FIG. 13 (E) includes the following:

An allocation map table 1105, which lists information on the address setting along the actual layout on an information recording medium (optical disc 10), the discrimination between recorded areas and unrecorded areas, and others.

Figure 16:
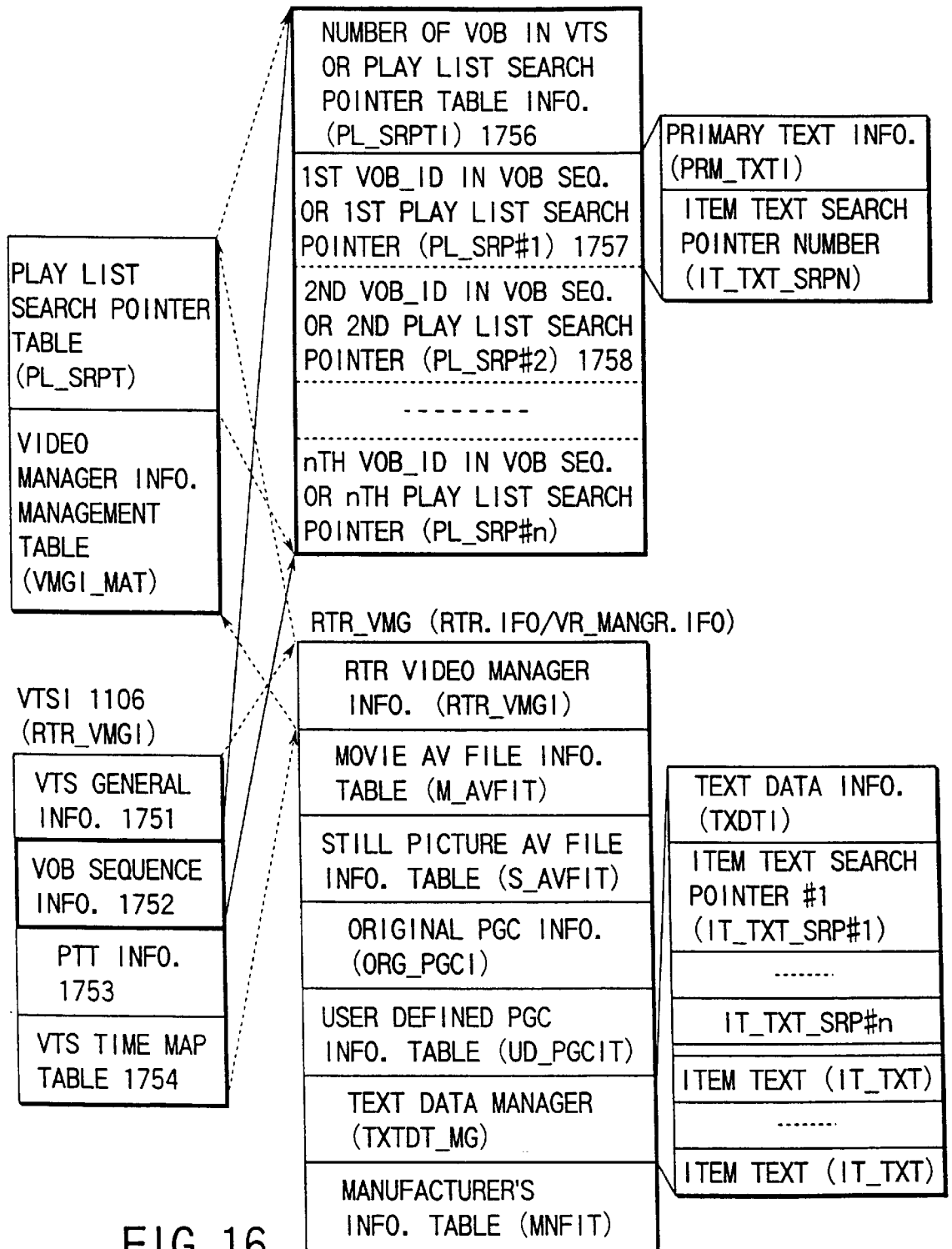
FIG. 16 is a diagram to help explain the data structure of management information (video title set information VTSI or management information RTR_VMGI for video real-time recording)

Video title set information VTSI (RTR_VMGI) 1106, which shows the overall contents of the AV files and includes information on the link between VOBs, grouping information on VOBs for management and search, and time information, such as a time map table (corresponding to RTR_VMGI of FIG. 16).

Video object information 1107, which shows information on each of the VOBs in the AV files and includes information on the attribute (characteristic) of each VOB and information on each VOBU included in VOB (corresponding to M_AVFIT/S_AVFIT of FIG. 16).

Figure 17:
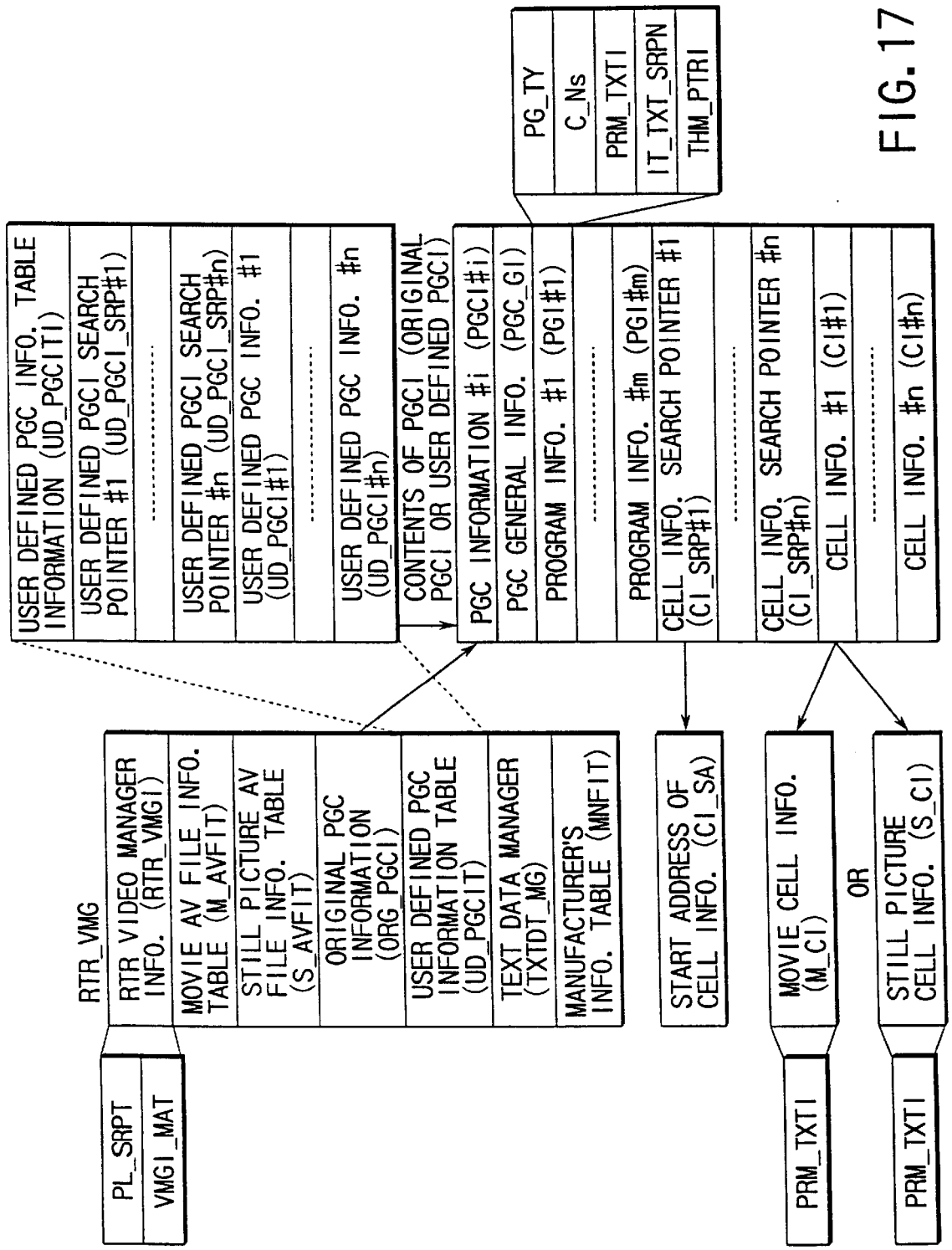
FIG. 17 is a diagram to help explain the data structure of control information/navigation data (RTR_VMG) in FIG. 13 or 16.

Program chain control information 1103, which is information on a video information playback program (sequence) (corresponding to PGCI of FIG. 17).

Cell playback information 1108, which is information on the data structure of a video information basic unit in playback (corresponding to CI of FIG. 17).

What has been described above is a general view of FIGS. 13 (A) to (F). Some supplementary explanation will be given about each piece of information.

What have been recorded in the volume & file manager information 1003 are the following:

Information on all the volume.

Information on the number of files of contained PC data and the number of files of AV data.

Recording layer information.

The following are recorded as the recording layer information:

The number of component layers (e.g., a single RAM/ROM two-layer disc is counted as two layers, a single ROM two-layer disc is counted as two layers, and an n number of single-sided discs are counted as n layers).

A logical sector number range table allocated to each layer (a capacity for each layer).

Characteristics for each layer (e.g., a DVD-RAM disc, the RAM section of a RAM/ROM two-layer disc, a CD-ROM, and a CD-R).

A logical sector number range table allocated zone by zone in the RAM area for each layer (including information on the capacity of the rewritable area for each layer).

ID information unique to each layer (e.g., information used to find disc replacement in a multiple-disc pack).

The recording layer information makes it possible to set consecutive logical sector numbers to a multiple-disc pack or a RAM/ROM two-layer disc to create a single large volume space.

Furthermore, the following are recorded in the playback control information 1021:

Information on a playback sequence for the integration of program chains PGCs.

The information (the sequence for reproducing all the recorded cells consecutively) indicating spurious recording positions when an information storage medium is regarded as a single tape, such as a VTR or a DVC.

Information on simultaneous playback of plural screens with different pieces of video information.

Retrieval information (that causes the corresponding ID and the start time table in the cell to be recorded for each retrieval category and enables the user to select a category and access the video information directly).

In the recording control information 1022, program reserved recording information and others have been recorded.

Additionally, the following are recorded in the edit control information 1023:

Special edit information for each PGC (where the relevant time setting information and special edit content are written as EDL information).

File conversion information (information used to convert a specific part of an AV file into a file capable of special editing on a PC, such as an AVI file and specify a place to store the converted file.

The following has been recorded in the thumbnail information 1024:

Management information on the thumbnail objects 1016, which includes the recording location of each thumbnail picture in the AV data area 1009, information used to specify the VOBs or cells to which each thumbnail picture relates, and information on the positions of the VOBs or cells to which each thumbnail picture relates.

Next, the directory structure of a data file stored onto the disc 10 of FIG. 13 will be explained.

All the information recorded in the data area 1004 of FIG. 13 (B) is recorded in files. The relationship between data files is managed in the form of a directory structure as shown in FIG. 14.

Figure 14:
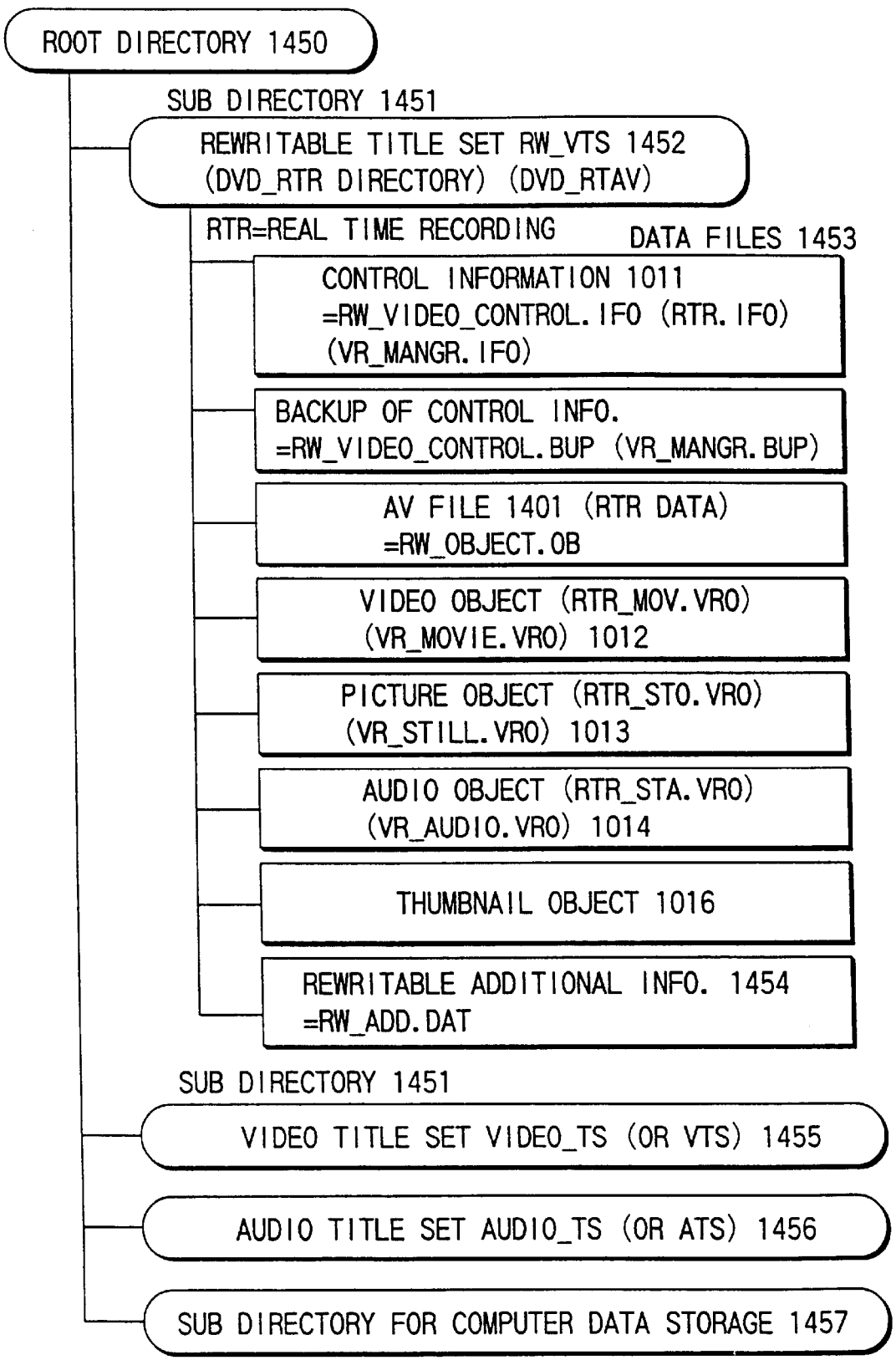
FIG. 14 is a diagram to help explain the directory structure of a data file stored on the optical disc of FIG. 13.

In FIG. 14, subdirectories 1451 are placed under a root directory 1450 to facilitate classification by the contents of a file recorded.

In the embodiment of FIG. 14, each data file of the computer data recorded in the computer data areas 1008, 1010 of FIG. 13 (C) is recorded under a computer data storage subdirectory 1457. In addition, the audio/video data recorded in the audio & video data area 1009 is recorded under the rewritable video title set RWV_TS (DVD_RTAV) 1452.

When the video information recorded on a DVD video disc (or DVD audio disc) is copied onto the disc of FIG. 13 (A), the video information is copied under the video title set VIDEO_TS 1455 and audio title set AUDIO_TS 1456.

The control signal 1011 of FIG. 13 (D) is recorded as recording/reproducing video management data into a single file. In the embodiment of FIG. 14, the file name is called RWVIDEO_CONTROL. IFO (or real-time recording information, abbreviated as RTR. IFO or VR_MANGR. IFO). Additionally, the same information is recorded as a backup copy under the file name RWVIDEO_CONTROL.BUP (or VR_MANGR. BUP).

In the embodiment of FIG. 14, the video objects (RTR_MOV. VRO or VR_MOVIE. VRO) 1012, picture objects (RTR_STO. VRO or VR_STILL. VRO) 1013, audio objects (RTR_STA. VRO or VR_AUDIO. VRO) 1014, and thumbnail objects 1016 in FIG. 13 (D) are all recorded into a single AV file 1401 (whose file name in the embodiment of FIG. 14 is RWOBJECT.OB).

Although not shown in FIG. 13, recording/reproducing additional information 1454 usable in recording and reproducing pictures can be recorded at the same time. All the information is recorded into a single file, whose file name is RWADD.DAT in the embodiment of FIG. 14.

Figure 15:
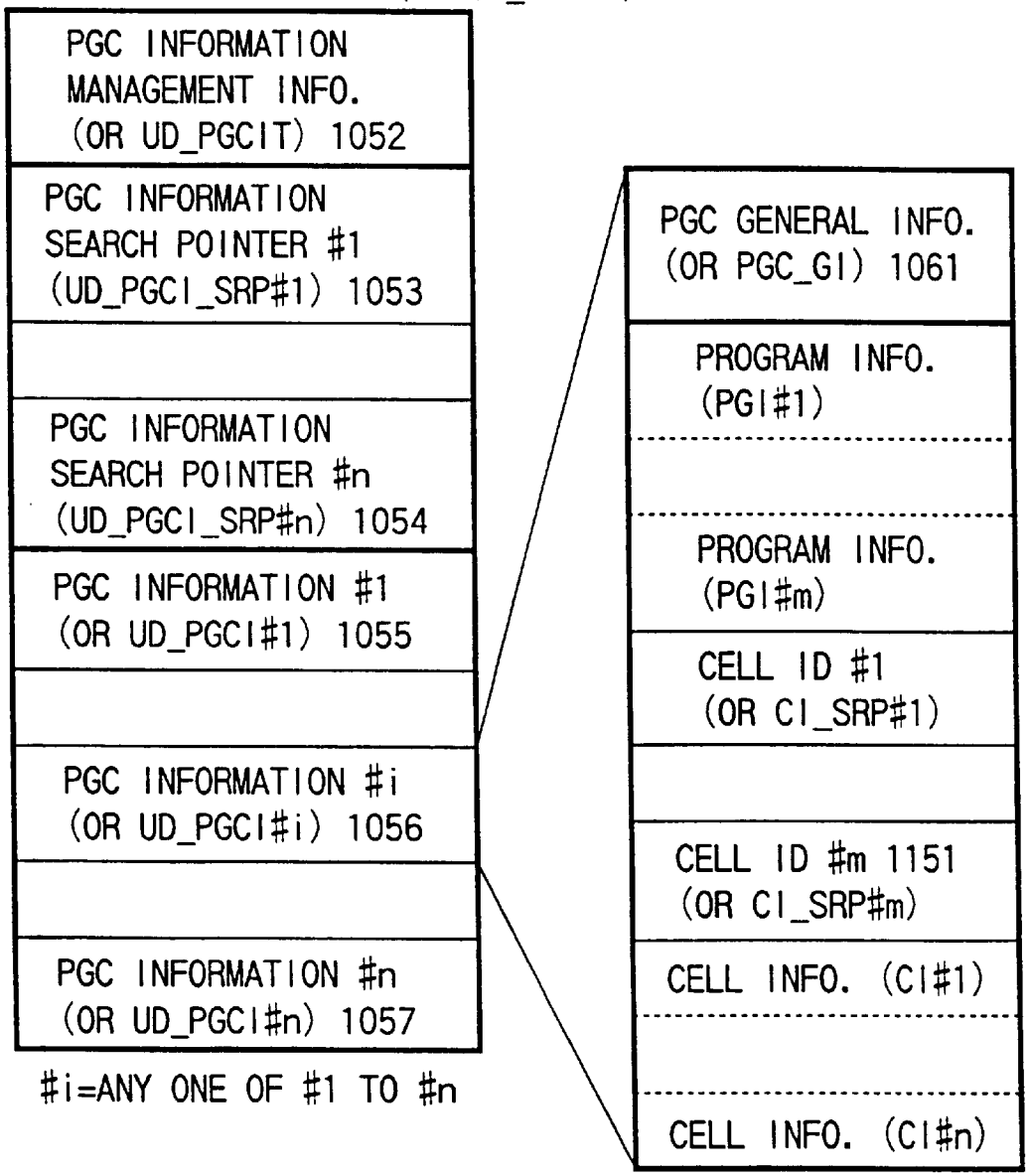
FIG. 15 is a diagram to help explain the data structure of program chain control information (including UD_PGCIT)

Next, the contents of the playback control signal 1021 in FIG. 13 (E) will be explained by reference to FIG. 15. FIG. 15 particularly shows the data structure of the program chain control information (UD_PGCIT and the like).

The program chain PGC control information 1103 in the playback control information 1021 has a data structure shown in FIG. 15. The playback sequence of the program chain PGC control information 1103 is determined by a program chains PGC and cells. The PGC is a unit in executing a series of playback specifying the order in which cells are reproduced. A cell is a playback section where the playback data in each VOB is specified using a start address and an end address.

The program chain control information 1103 is composed of PGC information management information (or PGCI management information) 1052, one or more search pointers for PGC information (or PGCI search pointers) 1053, 1054, and pieces of PGC information (PGCI) 1055, 1056, 1057.

The PGC information management information (or PGCI management information) 1052 includes information (PGCN) on the number of program chains PGCS. The search pointers for PGC information (or PGCI search pointers) 1053, 1054 point at the head of each PGC information (PGCI) and make it easy to search.

Each piece of the PGC information 1055, 1056, 1057 includes PGC general information (PGC_GI) 1061, one or more pieces of program information (PGI #m), one or more cell IDs (or cell information search pointers CI_SRP #m), and one or more pieces of cell information (CI #n).

The PGC general information (PGC_GI) 1061 includes the playback time of program chains PGCs and information on the number of cells (the number of pieces of cell playback information).

Alternatively, the PGC general information (PGC_GI) 1061 may include information (PG_Ns) indicating the number of programs PG and information (CI_SRP_Ns) indicating the number of cell information search pointers CI_SRP.

Here, it is assumed that the playback data is specified in a playback section from cell A to cell F and PGC information is defined in each PGC. In this case, for example, the following hold true, although not shown:

1. PGC #1 is made up of cells specifying consecutive playback sections. The playback sequence is Cell A→Cell B→Cell C.
2. PGC #2 is made up of cells specifying intermittent playback sections. The playback sequence is Cell D→Cell E→Cell F.
3. PGC #3 allows cells to be reproduced disorderly, regardless of the direction of playback or repetitive playback. The playback sequence is Cell E→Cell A→Cell D→Cell B→Cell E As shown in FIG. 13 (E), control information (RTR. IFO or VR_MANGR. IFO) 1011 in FIG. 13 or 14 includes the navigation data RTR_VMG (real-time recording video manager) corresponding to the pieces of control information 1101 and 1021. The RTR_VMG, as shown in FIG. 13 (F), includes video title set information VTSI (or RTR_VMG information RTR_VMGI) 1106.

The information (RTR_VMGI) 1106 includes the information used in reproducing the sequence of VOB.

FIG. 16 is a diagram to help explain the data structure of management information (video title set information VTSI or management information RTR_VMGI for video real-time recording).

Hereinafter, RTR_VMG of FIG. 13 (or RTR. IFO of FIG. 14), its data structure, and its contents will be described by reference to FIG. 16.

As shown in FIG. 16, the navigation data RTR_VMG (control information RTR. IFO or VR_MANGR. IFO) includes RTR video manager information (RTR_VMGI), a movie AV file information table (M_AVFIT), a still picture AV file information table (S_AVFIT), an original PGC information (ORG_PGCI), a user-defined PGC information table (UD_PGCIT), a text data manager (TXTDT_MG), and a table of information on manufacturer (MNFIT).

The TXTDT_MG, which has a structure as shown by (d) and (e) in FIG. 4, includes text data information (TXTDTI), one or more item text search pointers (IT_TXT_SRP #1 to IT_TXT_SRP #n), and one or more item texts (IT_TXT).

TXTDT_MG can be used as sub-information for the primary text information in a play list or a program.

Each IT_TXT_SRP # has the start address (IT_TXT_SA) for the corresponding IT_TXT and the size (IT_TXT_SZ) of the IT_TXT.

Each IT_TXT has information on the body of the corresponding text (text expressed in the character code determined by CHRS in FIG. 4 (e)).

The RTR_VMGI included in the RTR_VMG corresponds to video title set information (VTSI) 1106 in FIG. 13(F).

The information (RTR_VMGI) 1106, as shown in FIG. 16, includes VTS general information 1751, VOB sequence information 1752, PTT information 1753, and a VTS time map table 1754.

From a different point of view, the information (RTR_VMGI) 1106 includes a play list search pointer table (PL_SRPT) corresponding to VOB sequence information 1752 and a video manager information management table (VMGI_MAT) corresponding to VTS general information 1751.

The PL_SRPT includes information (PL_SRPTI) 1756 on the number of VOBs in VTS (or the number of play list search pointers and the end address for PL_SRPT), information 1757 on ID of the first VOB in a VOB sequence (or the first play list search pointer PL_SRP #1), information 1758 on ID of the second VOB in the VOB sequence (or the second play list search pointer PL_SRP #2), . . . , and the like.

Each play list search pointer (PL_SRP #) includes information (PL_TY) on the form of the play list, information (PGCN) on the number of the PGC corresponding to the play list, information (PL_CREATE_TM) on the date and time at which the play list was created, information (PRM_TXTI) on the primary text related to the play list, information (IT_TXTI_SRPN) on the number of the search pointer for the item text used in the play list, and thumbnail pointer information (THM_PTRI) indicating the reduced pictures (thumbnail pictures) corresponding to the contents of the video-recording of the play list (FIG. 16 shows only PRM_TXTI and IT_TXT_SRPN in PL_SRP #1).

The table (PL_SRPT) including those pieces of information 1756, 1757, 1758, . . . corresponds to the VOB sequence information 1752 included in VTSI (RTR_VMGI) 1106.

The contents of the VTSI (RTR_VMGI) 1106 are summarized as follows.

As shown in FIG. 16, the following are recorded in the video title set information (VTSI or RTR_VMGI) 1106:

Video title set general information 1751, which is information on items in the general contents of a video title set (or RTR data in the AV file 1401 of FIG. 14).

Video object sequence information 1752, in which information on the sequence of the VOBs is written, the sequence coming from the serial numbers assigned to all the VOBs in the video title set VTS (=AV file 1401).

Part-of-title information 1753, in which VOB information included in each part-of-title PTT is written, each group (part-of-title PTT) consisting of a set of VOBs, each group being assigned a video title name, and the object data items recorded in the AV file 1401 being grouped by related data for the purpose of data management and retrieval.

A video title set time map table 1754, which lists pieces of VOBU positional information at specific intervals of time according to the video object sequence about the VOBs classified into video objects 1012 and audio objects 1014 in the video title set VTS.

In a concrete data structure of the video object sequence information 1752, the total number of VOBs (or play list search pointer information PL_SRPTI) 1756 included in the video title set is recorded at the head at right in FIG. 16. Following that, VOB_IDs 1757, 1758, . . . of the corresponding VOBs (or PL_SRPs #1, #2, . . . , #n) are recorded in that order according to the sequence of the video objects.

The sequence shown in the video object sequence information 1752 can be set arbitrarily on the user side or the information recording/reproducing apparatus side, for example, in the order in which recording was done into an AV file (or in ascending order of recording time), in the order of recording location on an optical disc, or in the order of VOB size.

By arranging all the VOBs sequentially in the video title set, a user interface similar to a VTR that records pictures on a single tape can be provided.

For example, using the video object sequence information 1752, the following process can be performed:

The process of searching for the desired place by fast-forwarding (FF) and rewinding (FR) the tape.

The process of checking the entire contents of the recording by fast-forwarding the tape.

The process of finding the unnecessary video-recorded place by fast-forwarding (FF) and rewinding (FR) the tape and writing new video information over the unnecessary place.

FIG. 17 is a diagram to help explain the data structure of the control information/navigation data (RTR_VMG) of FIG. 13 or 16.

The RTR_VMG corresponds to the pieces of control information 1101 and 1021 in FIG. 13 (E) and to the control information (RTR. IFO or VR_MANGR. IFO) 1011 in the file structure of FIG. 14.

In the navigation data RTR_VMG, a user-defined PGC information table UD_PGCIT is composed of user-defined PGC information table information (UD_PGCITI), one or more user-defined information search pointers #1 to #n (UD_PGCI_SRP #1 to UD_PGCI_SRP #n), and as many pieces of user-defined PGC information as the number of those search pointers #1 to #n (UD_PGCI #1 to UD_PGCI #n).

Each piece of user-defined PGC information (one of UD_PGCI #1 to UD_PGCI #n) or PGC information #i (PGCI #i) corresponding in content to the original PGC information (ORG_PGCI) is composed of PGC general information (PGC_GI), one or more pieces of program information #1 to #m (PGI #1 to PGI #m), one or more cell information search pointers #1 to #n (CI_SRP #1 to CI_SRP #n), and as many pieces of cell information #1 to #1n as the number of those search pointers (CI #1 to CI #n).

Each piece of program information (e.g., PGI #1) includes a program type (PG_TY) including a protect flag that determines whether the relevant program should be protected from erroneous deletion, the number of cells (C_Ns) in the program, primary text information (PRM_TXTI), an item text search pointer number (IT_TXT_SRPN), and thumbnail pointer information (THM_PTRI).

Here, the first 64 bytes in the 128-byte PRM_TXTI are used in describing primary text using the ISO/IEC 646:1983 (ASCII) character set. If the text is shorter than 64 bytes, the deficiency is supplemented with "00h" to produce 64 bytes of text.

The last 64 bits in the 128-byte PRM_TXTI can be used in describing primary text using another character set.

Another character set can be determined by the primary text character set code (CHRS, not shown) written in the VMG management table (VMGI_MAT) in FIG. 16 or 17.

The character set for the last 64 bits in the PRM_TXTI is shared by all the primary texts on the disc 10.

Each cell information search pointer (one of CI_SRP #1 to CI_SRP #n) includes the start address (CI_SA) of the corresponding piece of cell information. Each piece of cell information (one of CI #1 to CI #n) includes information (M_CI) on movie cells or information (S_CI) on still picture cells.

Each M_CI and/or each S_CI can include primary text information PRM_TXTI therein.

Here, RTR_VMGI in FIG. 17 corresponds to video title set information in FIG. 13 (F), M_AVFIT and S_AVFIT in FIG. 17 corresponds to the video object information 1107 in FIG. 13 (F), and ORG_PGCI and UD_PGCIT in FIG. 17 corresponds to the PGC control information 1103 in FIG. 13 (F).

Additionally, PGCI #i in FIG. 17 corresponds to the PGC control information 1103 in FIG. 13 (F) and CI # corresponds to the cell playback information 1108 in FIG. 13 (F).

Figure 18:
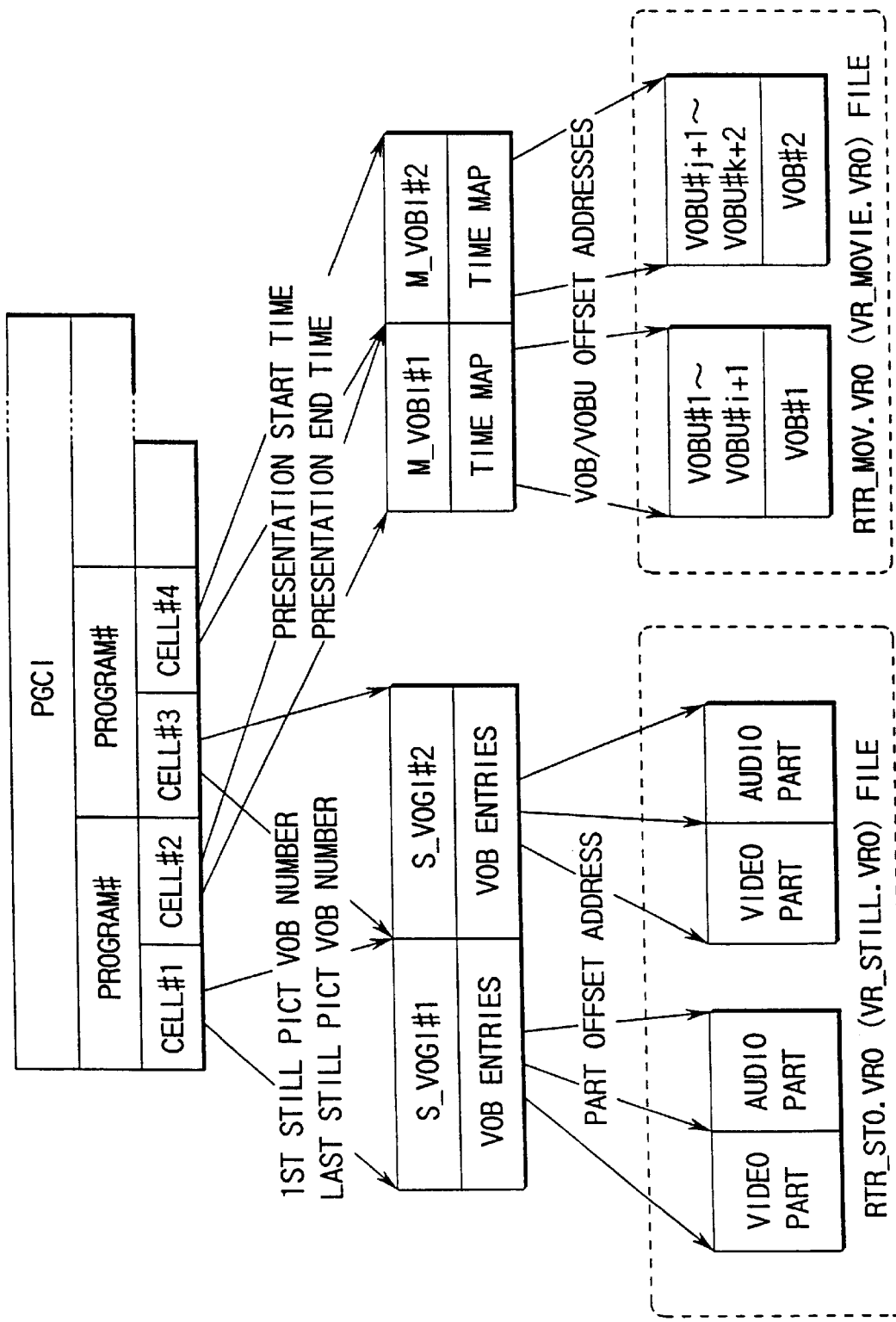
FIG. 18 is a diagram to help explain the relationship of still pictures VOB and movies VOB with the original PGC information.

FIG. 18 is a diagram to help explain an example of the structure of the original PGC information (ORG_PGCI in FIG. 16 or 17) including still picture VOBs (RTR_STO. VRO files) and movie VOBs (RTR_MOV. VRO files).

In FIG. 18, it is assumed that program #1 in PGCI #1 corresponds to VTS, S_VOGI #1 and S_VOGI #2 correspond to more than one VOB, and M_VOBI #1 and M_VOBI #2 correspond to more than one VOB.

On this assumption, picture objects 1013 constitute the contents (video part and audio part) of the RTR_STO. VRO (or VR_STILL. VRO) file in FIG. 18 and video objects 1012 constitute the contents (VOB #1, VOB #2, . . . ) of the RTR_MOV. VRO (or VR_MOVIE. VRO) file in FIG. 18.

In FIG. 18, cell # in PGCI can be linked with a VOB entry in S_VOGI #.

Additionally, the logical address for the video part or audio part in the RTR_STO. VRO file can be linked with the VOB number specified in a VOB entry in S_VOGI #.

Here, a time map TMAP in M_VOBI # in FIG. 18 will be explained.

The movie AV file information table M_AVFIT in FIG. 16 or 17, although not shown, includes movie AV file information general information (M_AVFI_GI), one or more movie VOB information search pointers (M_VOBI_SRP #1 to MVOBI_SRP #n), and as many pieces of movie VOB information as the number of those search pointers (M_VOBI #1 to M_VOBI #n).

Each M_VOBI #, although not shown, includes movie VOB general information (M_VOBI_GI), seamless information (SMLI), audio gap information (AGAPI), and time map information (TMAPI).

The TMAPI is used in performing special playback (e.g., reproduction of cells in the order determined by each user using the user-defined PGC) and time search.

The TMPI, although not shown, includes time map general information (TMAP_GI), one or more time entires (TM_ENT #1 to TM_ENT #r), and one or more VOB entries (VOBU_ENT #1 to VOBU_ENT #q).

Each VOBU entry includes information on the size of each VOBU and its playback time. The size of a VOBU is expressed in sectors (2 kilobytes or 2048 bytes) and the playback time is expressed in video fields (one field is equivalent to 1/60 second in the NTSC system and to 1/50 second in the PAL system).

Since the size of a VOBU is expressed in sectors, it is possible to access a VOBU using an address in sectors.

Each VOBU entry, although not shown, includes reference picture size information 1 STREF_SZ, VOBU playback time information VOBU_PB_TM, and VOBU size information VOBU_SZ.

Here, VOBU_PB_TM is the playback time of the relevant VOBU expressed in video fields. The reference picture size information 1 STREF_SZ is the size of the first reference picture of the relevant VOBU (corresponding to I picture in MPEG).

On the other hand, each time entry, although not shown, includes address information (VOBU_ADR) on the corresponding VOBU and time difference information (TM_DIEF). The time difference information represents the difference between the playback time specified by the time entry and the playback start time of the VOBU.

Now, if the time interval (time unit TMU) between two consecutive time entries is 10 seconds, the interval between the time entries corresponds to 60 fields in the NTSC video.

Although the time interval between VOBUs is generally expressed by the number of fields, it may be expressed by the value of a clock counter that counts from a VOBU to the next VOBU.

As a concrete example, the time interval between VOBUs may be expressed by the value of the difference between the presentation time stamp PTS at the start position of one VOBU and the PTS at the start position of the immediately following VOBU.

In other words, the time interval in the unit can be expressed by the value of the difference between the values of the clock counter in a specific unit.

The time map general information TMAP_GI, although not shown, includes TM_ENT_Ns representing the number of time entries in the relevant time map information, VOBU_ENT_Ns representing the number of VOBU entries in the time map information, time offset TM_OSF for the time map information, and the address offset ADR_OFS for the time map information.

In a case where the value (equivalent to 10 seconds) corresponding to 600 fields in the NTSC video (or 500 fields in the PAL video) is set as a time unit, the time offset TM_OSF is used to express a shift in time in TMU.

When the size of a VOB is expressed by the number of sectors, the address offset ADR_OFS is used to express a file pointer from the head of an AV file.

The time entry TM_ENT, although not shown, includes VOBU_ENTN indicating the number of the corresponding VOBU entry, TM_DIFF representing the difference in time between the playback start time for the VOBU specified by the time entry and the calculated playback time, and VOBU_ADR indicating the target VOBU address.

If a time unit TMU is expressed by 600 fields in the NTSC system (or a time unit TMU is expressed by 500 fields in the PAL system), the calculated playback time for time entry #j is expressed by TMU×(j−1)+TM_OSF.

If the VOBU size is expressed in sectors, the VOBU_ADR represents the target VOBU address in the total size of the preceding VOBUs in the relevant VOB.

In the data structure as described above, to start playback in the middle of a VOBU, its access point must be determined. The access point is defined as a time entry point.

The time entry point is a distance equivalent to the time difference indicated by TM_DIFF in the time entry TM_ENT away from the position represented by the movie address information in VOBU. The time entry point is a special playback start point (or time search point) indicated by the time map information TMAPI.

In FIG. 18, cell # in PGCI can be linked with the time map TMAP in M_VOBI # as is S_VOGI #.

FIG. 18 shows a case where the video field corresponding to the playback start time exists in the middle of VOBU #k. To represent the sequence of the video field group from the video field determined by the playback start time, it is necessary to enter the VOBU data to the decoder, starting at the head of the data. The reason is that even when the decoded fields are not be displayed, it is necessary to decode all the reference video fields having the playback time earlier than the playback start time. When the decoding work has reached the video field corresponding to the playback start time, the decoder starts to display video pictures.

It is desirable that the system should be constructed in such a manner that it can start to display pictures exactly from the video field corresponding to the playback start time, although this is not necessarily needed.

As described in detail, with the present invention, it is possible to provide an optical disc, an optical disc recording apparatus, and an optical disc reproducing apparatus which are capable of multilingual text retrieval.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording apparatus which uses an optical disc having a management area and a data area, said data area being provided for recording data in such a manner that the data is separated into one or more object units and is managed by one or more sequences and at least one sequence includes one or more programs corresponding to one or more cells, said data area including a program management table for managing said programs, said management area including sequence management information for managing the sequence of said programs and a program management table for managing said programs, said recording apparatus comprising:

first recording means for recording data into the data area on said optical disc; and second recording means for recording first text information into said program management table on said optical disc, said first text information consists of 128 bytes, and a first 64 byte portion of said first text information describes primary text using an ISO/IEC 646:1983 (ASCII) character set.

2. The recording apparatus according to claim 1, further comprising: third recording means for recording second text information usable in searching for said programs into an area which is different from a recording area of said program management table in said management area on said optical-disc.

3. The recording apparatus according to claim 2, wherein said second text information is expressed in the same language as that of said first text information.

4. The recording apparatus according to claim 2, wherein said second text information is expressed in a different language from that of said first text information.

5. The recording apparatus according to claim 2, wherein said second and third recording means record in such a manner that a search using said first text information has priority of search over a search using said second text information.

6. The recording apparatus of claim 1, wherein "00h" is used in said first 64 byte portion that is not utilized by said primary text.

7. The recording apparatus of claim 6, wherein a second 64 byte portion of said first text information describes primary text in a character set that is not ISO/IEC 646:1983 (ASCII).

8. The recording apparatus of claim 1, further comprising a third recording means for recording second text information, wherein the second text information is an item text search pointer number.

9. The recording apparatus of claim 1, further comprising a primary text determination unit.

10. A reproducing apparatus which uses an optical disc having a management area and a data area, said data area being provided for recording data in such a manner that the data is separated into one or more object units and is managed by one or more sequences and at least one sequence includes one or more programs corresponding to one or more cells, said data area including a program management table for managing said programs, said management area including a sequence management information for managing the sequence of said programs and a program management table for managing the sequence of said programs and a program management table for managing said programs, said reproducing apparatus comprising:

means for reading information recorded on the optical disc, the information to be read by said reading means being configured to include said first text information and/or said second text information: and means for decoding the information read by said reading means to provide an output containing information of said first text information and/or said second text information, said primary text inform ation consists of 128 bytes, and a first 64 byte portion of said primary text information describes primary text using an ISO/IEC 646:1983 (ASCII) character set.

11. The reproducing apparatus according to claim 10, further comprising:

second retrieving means for retrieving a program using other text information different from said primary text information.

12. The reproducing apparatus according to claim 11, wherein a search using said primary text information has priority over a search using said other text information.

13. The reproducing apparatus of claim 10, wherein "00h" is used in said first 64 byte portion that is not utilized by said primary text.

14. The reproducing apparatus of claim 13, wherein a second 64 byte portion of said primary text information describes primary text in a character set that is not ISO/IEC 646:1983 (ASCII).

15. The reproducing apparatus of claim 10, wherein said program management table comprises an item text search pointer number.

16. A method for displaying text information, which uses an optical disc having a management area and a data area in which one or more programs have been recorded, said management area including a sequence management information for managing the sequence of said programs and a program management table for managing said programs, said method comprising:

preparing first data from primary text information recorded in said program management table;

preparing second data from an item text recorded in a portion of said management area; and preparing display data including said first data and second data for displaying contents of said primary text information, wherein said primary text information consists of 128 bytes, wherein a first 64 byte portion of said primary text information describes primary text using an ISO/IEC 646:1983 (ASCII) character set.

17. The method of claim 16, wherein "00h" is used in said first 64 byte portion that is not utilized by said primary text.

18. The method of claim 17, wherein a second 64 byte portion of said primary text information describes primary text in a character set that is not ISO/IEC 646:1983 (ASCII).

19. The method of claim 16, wherein said program management table comprises an item text search pointer number.

20. An information storage medium comprising a management area and a data area, said data area being provided for recording data in such a manner that the data is separated into one or more object units and is managed by one or more sequences and at least one sequence includes one or more programs corresponding to one or more cells representing or pointing to at least part of the object units, said management area including a sequence management information for managing program sequences by determining a presentation sequence of said cells, and including a program management table for managing said programs, wherein said program management table is configured to store first text information expressed in character, and a specific area, which is different from a recording area of said program management table in said management area, is configured to store second text information, said program management table is configured to further store search information which includes a search pointer number of the second text information, and said search pointer number corresponding to a search pointer is stored in said specific area, said search pointer which corresponds to the search pointer number indicating a location of the second text information, said first text information consists of 128 bytes, and a first 64 byte portion of said first text information describes primary text using an ISO/IEC 646:1983 (ASCII) character set.

21. The information storage medium of claim 20, wherein "00h" is used in said first 64 byte portion that is not utilized by said primary text.

22. The information storage medium of claim 21, wherein a second 64 byte portion of said first text information describes primary text in a character set that is not ISO/IEC 646:1983 (ASCII).

23. The information storage medium of claim 20, wherein said program management table comprises an item text search pointer number.

24. An apparatus for recording information on the medium of claim 20, wherein the information to be recorded by the apparatus comprising at least one of said first text information and said second text information.

25. An apparatus for playing back information recorded on the medium of claim 20, wherein the information to be played back by the apparatus comprising at least one of said first text information and said second text information.

* * * * *